United States Patent
Yen et al.

(10) Patent No.: US 8,254,654 B2
(45) Date of Patent: Aug. 28, 2012

(54) SIDELOBE SUPPRESSION IN ULTRASOUND IMAGING USING DUAL APODIZATION WITH CROSS-CORRELATION

(75) Inventors: Jesse T. Yen, San Gabriel, CA (US); Chi Hyung Seo, Issaquah, WA (US)

(73) Assignee: University of Southern California, Los Angeles, CA (US)

( * ) Notice: Subject to any disclaimer, the term of this patent is extended or adjusted under 35 U.S.C. 154(b) by 864 days.

(21) Appl. No.: 12/261,922

(22) Filed: Oct. 30, 2008

(65) Prior Publication Data
US 2009/0141957 A1     Jun. 4, 2009

Related U.S. Application Data

(60) Provisional application No. 60/984,287, filed on Oct. 31, 2007.

(51) Int. Cl.
*G06T 7/00* (2006.01)

(52) U.S. Cl. .......... 382/131; 382/128; 382/254; 600/437

(58) Field of Classification Search .................. 382/131, 382/128, 254; 600/437
See application file for complete search history.

(56) References Cited

U.S. PATENT DOCUMENTS
6,436,044 B1    8/2002    Wang

OTHER PUBLICATIONS

Bilge et al. Motion Estimation Using Common Spatial Frequencies in Synthetic Aperture Imaging. 1996 IEEE Ultrasonics Symposium, pp. 1551-1554.
Krishnan et al. Efficient Parallel Adaptive Aberration Correction. IEEE Transactions on Ultrasonics, Ferroelectrics, and Frequency Control, vol. 45, No. 3, pp. 691-703, May 1998.
Li et al. Blocked Element Compensation in Phased Array Imaging. IEEE Transactions on Ultrasonics, Ferroelectrics, and Frequency Control, vol. 40, No. 4, pp. 283-292, Jul. 1993.
Li et al. Adaptive Imaging Using the Generalized Coherence Factor. IEEE Transactions on Ultrasonics, Ferroelectrics, and Frequency Control, vol. 50, No. 2, pp. 128-141, Feb. 2003.
Smith et al. An overview of the status of imaging screening technology for breast cancer. Annals of Oncology, 15 (Supplement 1): pp. i18-i26, 2004.
Stankwitz et al. Nonlinear Apodization for Sidelobe Control in SAR Imagery. IEEE Transactions on Aerospace and Electronic Systems, vol. 31, No. 1, pp. 267-279, Jan. 1995.

*Primary Examiner* — Long Pham
(74) *Attorney, Agent, or Firm* — McDermott Will & Emery LLP

(57) ABSTRACT

Sidelobe and clutter suppression techniques in ultrasound imaging are described and referred to as Dual Apodization with Cross-correlation or "DAX". DAX dramatically improves the contrast-to-noise ratio (CNR) allowing for easier visualization of anechoic cysts and blood vessels. These techniques use dual apodization or weighting strategies that are effective in removing or minimizing clutter and efficient in terms of computational load and hardware/software needs. This dual apodization allows for determination of the amount of mainlobe versus clutter contribution in a signal by cross-correlating RF data acquired from two apodization functions.

24 Claims, 18 Drawing Sheets

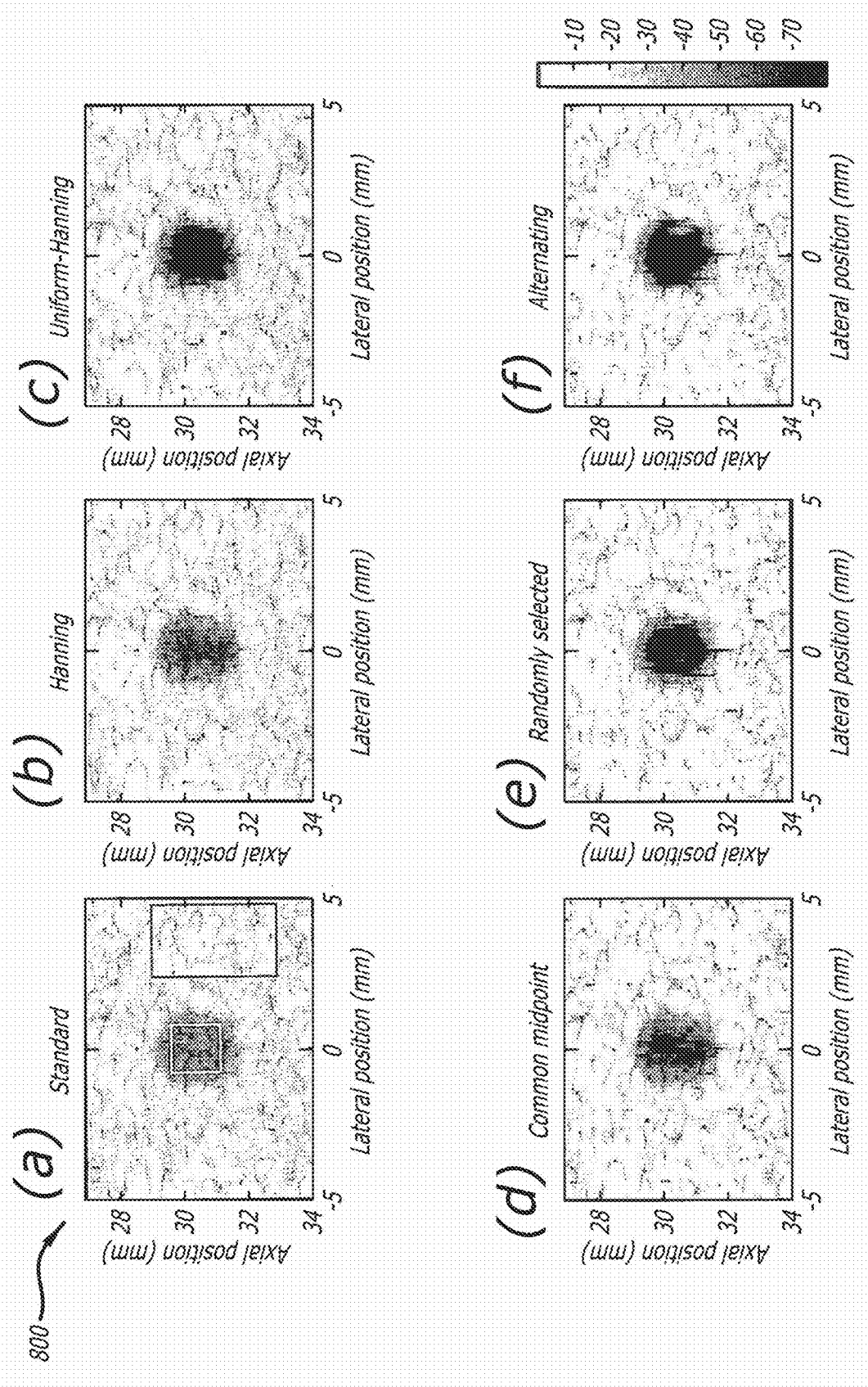

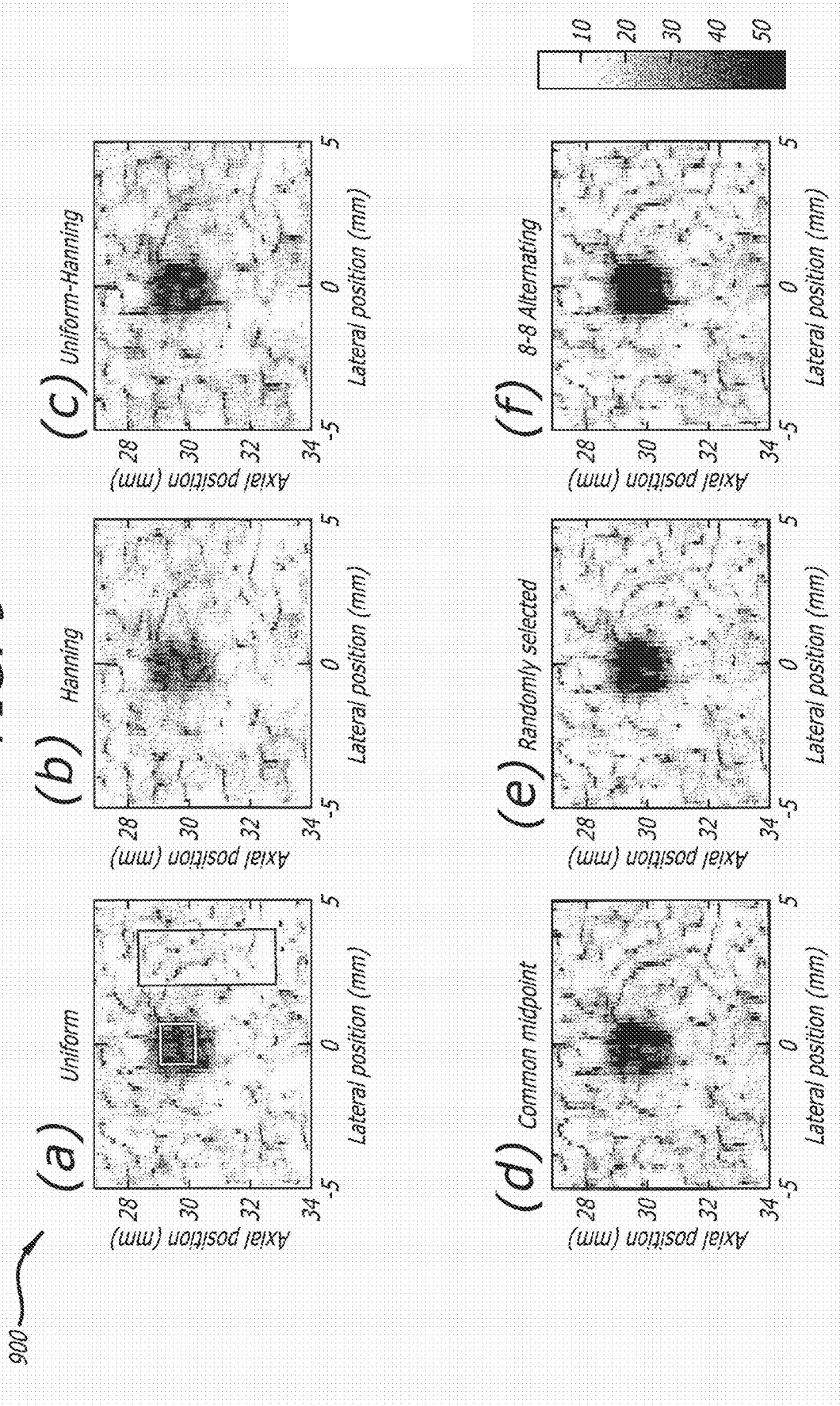

ND USING DUAL APODIZATION
SIDELOBE SUPPRESSION IN ULTRASOUND IMAGING USING DUAL APODIZATION WITH CROSS-CORRELATION

CROSS-REFERENCE TO RELATED APPLICATION

This application claims the benefit of U.S. Provisional Application No. 60/984,287 entitled "Novel Apodization Technique for Sidelobe Suppression in Ultrasound Imaging," filed Oct. 31, 2007, the entire contents of which are incorporated herein by reference.

STATEMENT REGARDING FEDERALLY SPONSORED RESEARCH

This work was funded in part by National Institute of Health Grant Nos. 5R21CA112174-02 and the Coulter Early Career Award. The Government has certain rights in the invention.

BACKGROUND

The propagation of sound in a medium follows diffraction theory. Proper focusing, under the Fresnel approximation, can achieve diffraction-limited resolution, where the field pattern is given by the spatial Fourier transform of the aperture function.

This inherent nature of ultrasound imaging gives rise to side lobes (or clutter). These effects are undesirable side effects since they degrade image quality by lowering the contrast to noise ratio ("CNR" or contrast resolution) and the detectability of small targets (or spatial resolution). Typically a type of Gaussian windowing function such as Hanning or Hamming apodization is applied. The point spread function of a uniform aperture gives a narrower main beam or better spatial resolution with higher side lobe level compared to a Hanning or Hamming apodized aperture. These types of weighting functions are called linear apodization functions since the same weighting is applied across the aperture independent of depth or of imaging line. They lower the side lobes at the expense of the main lobe resolution. Therefore there have been numerous researches in nonlinear side lobe suppression methods, which aim for little or no loss main lobe resolution.

The goal of beamforming is to focus ultrasound energy to one location only, but this is not truly achievable with standard delay and sum beamforming. This gives rise to off-axis sidelobes and clutter. These sidelobes or clutter inherent in ultrasound imaging are undesirable side effects since they degrade image quality by lowering CNR and the detectability of small targets.

As described previously, one way to improve CNR is to reduce sidelobe and clutter levels by applying a weighting or shaping function such as a Hanning or Hamming apodization across the transmit and receive apertures. These types of weighting functions are called linear apodization functions since the same weighting is applied to the aperture independent of depth or of imaging line. As a trade-off, they lower the sidelobes at the expense of worse mainlobe lateral resolution. To avoid making this trade-off, there have been several publications in nonlinear sidelobe suppression methods which aim for little or no loss in mainlobe resolution while achieving low clutter levels commonly associated with apodization.

In recent work, Guenther and Walker developed optimal apodization functions using constrained least squares theory. This method creates apodization functions with the goal of limiting the energy of the point spread function (PSF) outside a certain area and maintaining a peak at the focus. A point target simulation was performed using a linear array with 192 elements with 200 µm element pitch and a transmit frequency of 6.5 MHz. Using this method, a 5-10 dB reduction in sidelobe levels compared to a Hamming apodization was achieved. Wang used a comparator to select the minimum magnitude from two or more sets of data using various apodization methods, such as uniform, Hanning or Hamming. By taking the minimum magnitude on a pixel-by-pixel basis, this method preserves the mainlobe resolution of the uniformly apodized data and lowers sidelobes similar to a Hanning or Hamming apodized data. Stankwitz developed a spatially variant nonlinear apodization (SVA) technique, which uses the lateral phase differences between Hanning and uniformly apodized data to distinguish between mainlobe and clutter signals. This is accomplished by taking advantage of the properties of raised-cosine weighting functions and finding the optimal apodization function on a pixel-by-pixel basis.

H. C. Stankwitz explored spatially variant nonlinear apodization (known as SVA) technique, which uses the phase differences between Hanning and uniformly apodized data. The optimal apodization is achieved on a pixel-by-pixel basis. Hong Wang used the idea of Stankwitz where a comparator is used to select a minimum amplitude from two more sets of data using various apodization methods, such as uniform, Hanning or Hamming. By using the minimum amplitude on a pixel-by-pixel basis, this method preserves the main lobe resolution of the uniformly apodized data and lowers side lobes similar to a Hanning or Hamming apodized data. Pai-Chi Li expanded the idea of coherence factor (CF) to get generalized coherence factor (GCF) to calculate the spectral energy ratio. He demonstrated that the low frequency component of the element domain spectrum corresponds to the coherent portion of the received data, and that the high frequency component corresponds to the incoherent portion. The coherence factor matrix is calculated as the ratio of the spectral energy within a low frequency region to the total energy and used as a pixel-by-pixel "weighting" matrix.

Another well known example is parallel adaptive receive compensation algorithm (PARCA). Using total least square (TLS), this method works well with a point target but the improvement is disputable with speckled targets. A modified version PARCA2 also was proposed where the parallel beam formation is approximated by Fourier transform of the aperture data and an iterative scheme is used to simplify the calculation in PARCA.

All these methods are successful in lowering side lobe level. The results, however, are obtained at certain imaging conditions or at the expense of heavy computation and extra hardware circuits.

Even though ultrasound has been used to image the human body for at least 50 years and is one of the most widely used diagnostic tools in modern medicine, the inherent nature of ultrasound imaging gives rise to side lobes (or clutter) which are undesirable side effects since they degrade image quality by lowering the contrast to noise ratio (or contrast resolution) and the detectability of small targets (or spatial resolution).

An ideal contrast improvement method would greatly improve contrast such that lesions are easily visualized without significantly increasing computational complexity, worsening lateral and/or temporal resolution.

SUMMARY

Embodiments of the present disclosure are directed to novel sidelobe and clutter suppression methods/techniques.

Embodiments of the present disclosure can provide side lobe suppression that is superior or equivalent to the existing techniques in terms of contrast resolution and spatial resolution without extra computation load or hardware.

The techniques can utilize dual apodization functions with normalized cross-correlation to suppress sidelobes while at the same time maintaining lateral resolution.

Such techniques can be used in ultrasound imaging may be referred to herein as "Dual Apodization with Cross-correlation" or "DAX". DAX dramatically improves the contrast-to-noise ratio (CNR) allowing for easier visualization of anechoic cysts and blood vessels. These techniques use dual apodization or weighting strategies that are effective in removing or minimizing clutter and efficient in terms of computational load and hardware/software needs. This dual apodization allows for determination of the amount of mainlobe versus clutter contribution in a signal by cross-correlating RF data acquired from two apodization functions.

Embodiments of the present disclosure can be implemented in hardware, software, firmware, or any combinations of such, and over one or more networks.

Other features and advantages of the present disclosure will be understood upon reading and understanding the detailed description of exemplary embodiments, described herein, in conjunction with reference to the drawings.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 8 depicts a combined plot of simulated images of a 3 mm diameter anechoic cyst with standard beamforming with uniform apodization, Hanning apodization and the four DAX schemes, in accordance with an exemplary embodiment of the present disclosure;

FIG. 9 shows a combined plot 900 of the result from the cyst experiment using the Ultrasonix Sonix RP system and ATS tissue-mimicking phantom containing a 3 mm diameter anechoic cyst, in accordance with an exemplary embodiment of the present disclosure;

In FIG. 12, the standard beamformed PSF is compared with (a) uniform-Hanning scheme, (b) common midpoint scheme, (c) random scheme, and (d) the alternating pattern scheme, in accordance with an exemplary embodiment of the present disclosure.

Figure 1:
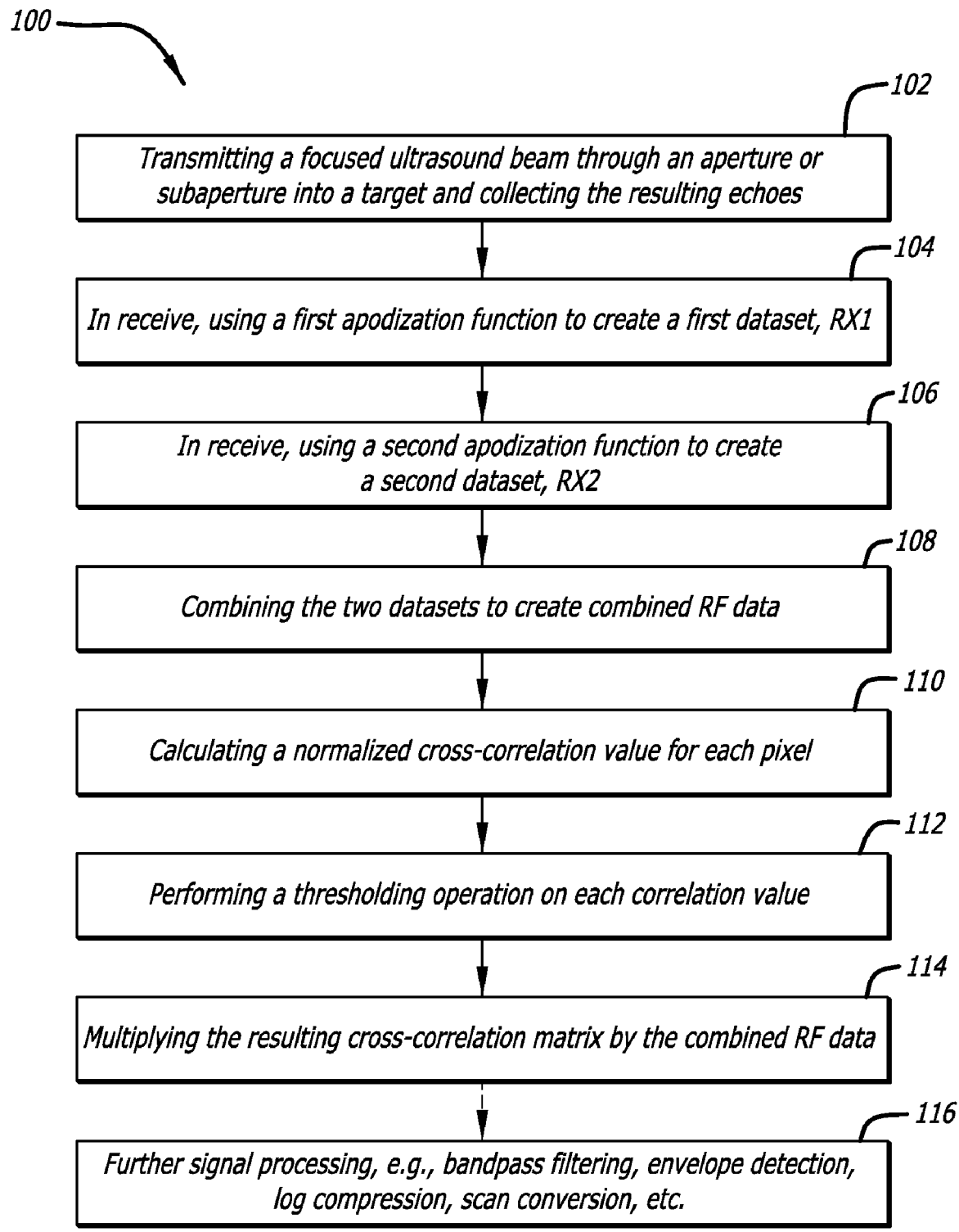
FIG. 1 depicts a block diagram for a general method for dual apodization with cross-correlation (DAX), in accordance with exemplary embodiments of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Embodiments of the present disclosure utilize dual apodization functions with normalized cross-correlation to suppress side lobes while maintaining lateral resolution. These techniques can dramatically improves contrast-to-noise ratio (CNR) allowing for easier detection of low contrast targets such as breast and prostate lesions. These techniques uses apodization or weighting strategies that are effective in removing or minimizing side lobes and efficient in terms of computational load and hardware/software requirements in comparison with other existing linear/nonlinear apodization methods.

Dual apodization with cross-correlation (also referred to as "DAX") uses two sets of beamformed data acquired with two receive apertures and cross correlates them for each line. The resulting cross-correlation matrix can serve as a pixel-by-pixel weighting function, which can be multiplied to the sum of the two data sets. Dual Apodization with Cross-correlation (DAX) provides superior results when compared to existing nonlinear apodization methods in terms of contrast resolution, without compromising spatial resolution with less computation and using already existing hardware.

DAX techniques of acquiring two sets of data can still keep the received signals from the transmit beam direction (or the main lobe in the point spread function) similar and the side lobes can be suppressed considerably without compromising the main lobe resolution. The two data sets will have a similar main beam and different or negatively correlated side beams, clutter and/or grating lobes. In the cross correlation matrix, the high cross correlation close to 1 implies the main lobe signal and the low or negative cross correlation means clutter region. Utilizing this property, the threshold can be set to zero or an arbitrary value close to zero to suppress undesired clutter.

Improving the contrast of ultrasound through use of techniques of the present disclosure can provide many clinically significant applications. For example, in breast ultrasound, the differentiation of solid and cystic masses (which is the main point of the procedure) can be improved. Simple anechoic cysts with fill-in (e.g., caused by multiple scattering, reverberations and clutter) can be more effectively detected. Such cysts could otherwise be misclassified as malignant lesions. Levels of fill-in can be increased in the presence of aberrations caused by intermittent layers of fat and tissue.

Delineation of carcinoma may also be improved with better signal processing methods that improve contrast. Similar problems, arising when imaging other soft tissue, can be more effectively accommodated or mitigated. For example, for hepatic imaging, visualization of cystic liver lesions and dilated bile ducts can be improved. Additionally, the visualization of prostate cancer may be improved since prostate cancer is usually hypoechoic.

Embodiments of the present disclosure are directed to target-dependent clutter suppression methods/techniques using pairs of apodization functions. By using certain pairs of apodization functions, mainlobe signals can be passed and clutter signals can be attenuated using normalized cross-correlation coefficients of RF signals in the axial direction. The amount of attenuation is proportional to the amount of clutter in the signal. A target-dependent weighting matrix is created that will be multiplied to the standard beamformed image. In a point target simulation, using a linear array with 128 elements with element pitch of 308 μm and a transmit frequency of 5 MHz, this technique lowers clutter levels by over 40 dB compared to standard beamformed data with a uniform apodization while keeping the same mainlobe resolution with a minimal computation load.

Designs

Assuming linearity, any ultrasound echo signal can be thought of as the sum of two signals: one signal is the mainlobe contribution which is desired and one signal from the sidelobes, grating lobes, and other forms of clutter which reduces image contrast.

The amount of mainlobe contribution and sidelobe contribution depends on two factors:
1) the ratio of the mainlobe amplitude to the sidelobe amplitude and 2) the strength of the scatterers within the mainlobe versus the strength of the scatterers in the clutter region. To improve contrast, one would like to remove or at least minimize contributions from clutter.

According to the present disclosure, an approach to removing clutter is to distinguish the mainlobe dominated signals from clutter signals by developing two point spread functions using two different apodization functions. These two apodization functions give similar mainlobe signals and very different clutter patterns. Therefore, echoes from a target, such as speckle or a point target, which comprises primarily of mainlobe components will look similar to each other, but echoes from a target, such as a cyst, which are mainly clutter will appear different from each other. Signals from a target which consists of a comparable contribution from both mainlobe and clutter will be partially similar.

The degree of similarity can be quantified using normalized cross-correlation between the two signals RX1 and RX2 from two PSFs. Normalized cross-correlation (NCC) is performed using segments of RF data along the axial direction at zero lag. The normalized cross-correlation coefficient ρ at zero lag is calculated for every sample and used as a target-dependent pixel-by-pixel weighting matrix, which passes mainlobe dominated signals and attenuates clutter dominated signals (1). The post beamformed RF data is then multiplied by this weighting matrix.

$$\rho(i, j) = \frac{\sum_{k=i-A}^{i+A} RX1(k, j) RX2(k, j)}{\sqrt{\sum_{k=i-A}^{i+A} RX1(k, j)^2} \sqrt{\sum_{k=i-A}^{i+A} RX2(k, j)^2}} \quad \text{(Eq. 1)}$$

In Eq. 1, index i indicates the ith sample in image line j. The total cross-correlation segment length is 2A+1 25 samples. Eq. 1 can be arrived at from the integral form of cross-correlation functions, ρ, calculated for every sample; thus, an image-dependent weighting matrix can be created that emphasizes signals consisting of main lobe contributions and that attenuates signals consisting of clutter:

$$\rho = \frac{\int h_1(t) h_2(t) dt}{\sqrt{\int h_1^2(t) dt} \sqrt{\int h_2^2(t) dt}}.$$

With regards to Eq. 1, normalized cross-correlation coefficients range from −1 to 1. Two signals are identical if the cross-correlation coefficient is 1 and they are considered uncorrelated if the coefficient is near or below zero. Signals would be somewhat correlated if ρ is in between 0 and 1. In the proposed method, if the coefficient is greater than or equal to a set threshold value $\epsilon > 0$, then the sample value will be multiplied by the cross-correlation coefficient. If the coefficient is less than the threshold value $\epsilon$, the sample value is multiplied by the threshold value $\epsilon$. This algorithm is called dual apodization with cross-correlation or DAX. A general system block diagram is shown in FIG. 1.

FIG. 1 depicts a block diagram for a general method 100 for dual apodization with cross-correlation (DAX), in accordance with exemplary embodiments of the present disclosure.

Detailed steps to acquire a DAX processed image as in method 100 are as follows:

1) An aperture (or subaperture) (e.g., with 64 elements) transmits a focused beam into the target. Echoes are collected from the same 64 elements, as described at 102.
2) In receive, beamforming can be performed using a first apodization function to create dataset RX1, as described at 104.
3) Likewise, a second apodization function can be used to create dataset RX2, as described at 106.
4) These two data sets are used to create the combined RF data, as described at 108 (e.g., and shown at 224 in FIG. 2B). The combined RF data can be obtained by taking the minimum magnitude of RX1 and RX2 or the sum of RX1 and RX2.
5) A cross-correlator calculates a normalized cross-correlation value for each pixel. Typically 2-3 wavelengths are used as a segment size for cross-correlation, as described at 110.
6) The value is sent to a thresholding operator, as described at 112. If the value is less than or equal to $\epsilon$, then replace it with $\epsilon$. If it is greater than $\epsilon$, then leave it unchanged.
7) The resulting cross-correlation matrix is multiplied by the combined RF data, as described at 114.

8) The DAX RF data can undergo further signal processing such as bandpass filtering, envelope detection, log-compression, and scan conversion, as described at 116.

Figure 2A:
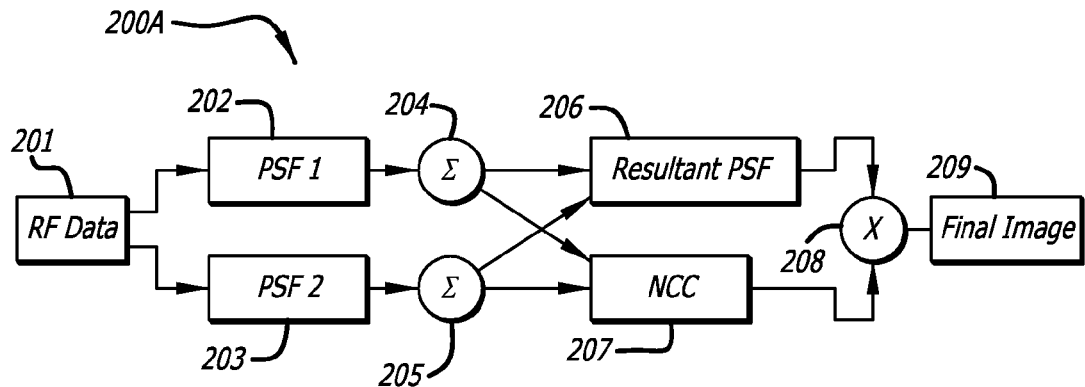
FIG. 2. includes FIGS. 2A and 2B depicting system embodiments 200A and 200B for dual apodization with cross-correlation (DAX), in accordance with exemplary embodiments of the present disclosure.
Figure 2B:
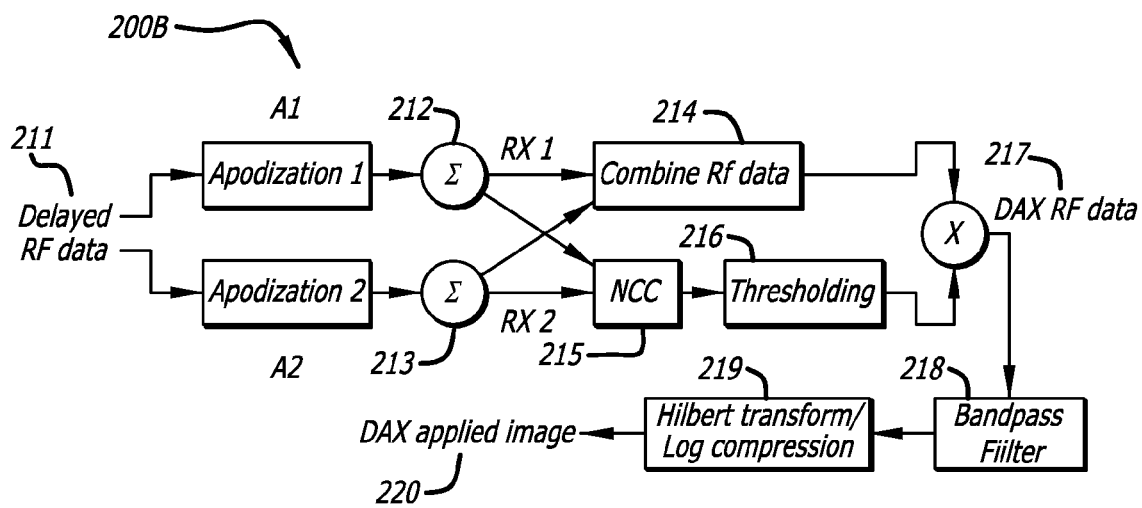

FIG. 2. includes FIGS. 2A and 2B depicting system embodiments 200A and 200B for dual apodization with cross-correlation (DAX), in accordance with exemplary embodiments of the present disclosure. In FIG. 2A, delayed RF data 201 is processed with two different apodization functions, producing two difference point spread functions (PSFs) 202 and 203, respectively. Two summers 204, 205 each sum data from the respective PSF. The PSFs 202 and 203 are then combine (by a suitable process as described for FIG. 2B) and a resulting PSF 206 is achieved. The PSFs 202 and 203 are also subject to a normalized cross-correlation 207. The resultant PSF 206 and normalized cross-correlation 207 are then multiplied, giving a final image 209. Additional refinements to 200A are described, infra, for FIG. 2B.

In FIG. 2B, delayed data 210 is processed with two receive apodization functions A1, A2 to create beamformed RF data sets RX1 (212) and RX2 (213).

Combined RF data 214 can be obtained by taking the minimum magnitude of RX1 and RX2 or the sum of RX1 and RX2. RX1 and RX2 can be combined in different ways. One way to combine is through a minimum function, e.g., as provide in Eq. 2, infra.

$$DAXCC = \begin{cases} \rho, & \rho \geq \varepsilon \\ \varepsilon & \rho < \varepsilon \end{cases} \quad \text{(Eq. 2)}$$

where $\rho$ can be calculated using Eq. 1, supra.

This min function can be used to select the minimum magnitude at each sample between the two data sets RX1 and RX2. Another way to combine is to add them. This is the case when the two apodization functions are complementary shown later in this section. Simply adding the two data sets RX1 and RX from the complementary apodization functions would give the same data from a standard receive aperture. If the cross-correlation value is less than a threshold value $\varepsilon$ (216), the value will be replaced with the set threshold value, e.g., as specified in Eq. 2, supra. This signal is considered to be mainly clutter and needs to be suppressed. Signals having a comparable mixture of mainlobe and clutter will receive a reduction between 1 and $\varepsilon$. The cross-correlation matrix 215 is multiplied to the combined RF data 214 to provide a DAX RF data image 217. Further processing can be performed, such as by a bandpass filter 218, and/or a Hilbert transform/log compression 219, etc. to provide a DAX applied image 220.

Figure 3:
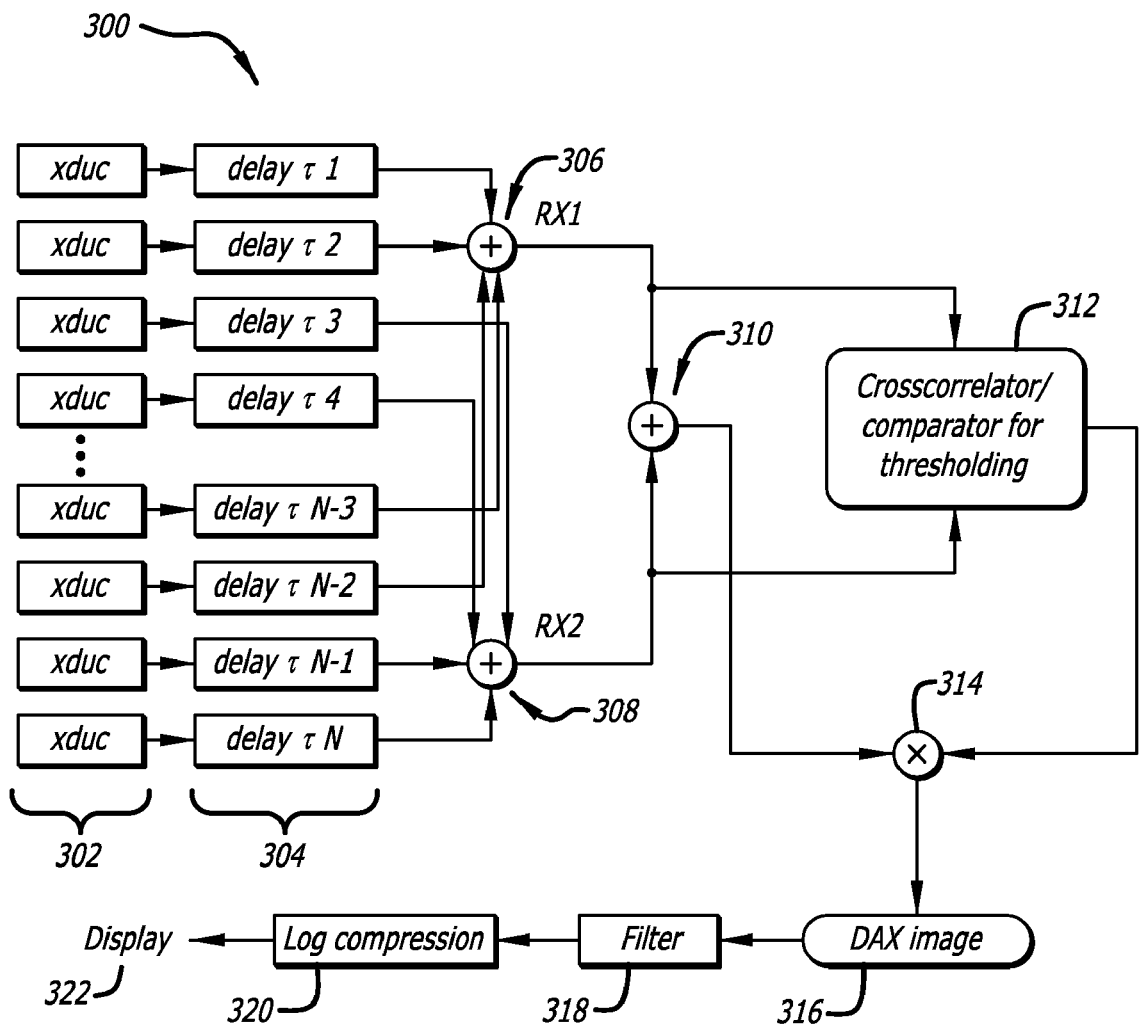
FIG. 3 depicts a schematic view of a system in accordance with an exemplary embodiment of the present disclosure.

FIG. 3 depicts a schematic view of a system 300 in accordance with an exemplary embodiment of the present disclosure. The system 300 can include an array 302 (e.g., of ultrasound transducers/receivers) and a plurality of delay devices (e.g., delay lines or phase delays) 304, each couples to an element of the array 302. Data from alternating groups of elements are combined at 306 and 308 to form first and second data sets RX1 and RX2. The data sets (RX1, RX2) can (i) be combined at 310, and (ii) provided to a cross-correlator/thresholder 312. The signals from 310 and 312 can then be multiplied at 314 to form a DAX image 316. The DAX image 316 can (optionally) undergo further processing, e.g., as at filter 318 and log compression at 320, to produce a display image 322.

As described below, the performance of four pairs of apodization functions were investigated, where each pair has a well correlated mainlobe response and a different or uncorrelated sidelobe response. All methods used echo datasets formed from each apodization and calculate a weighting matrix by cross-correlating image pairs. All apodization pairs have the same goal of suppressing clutter levels, thus increasing CNR, while maintaining mainlobe resolution.

Apodization Scheme 1: Uniform and Hanning

Figure 4:
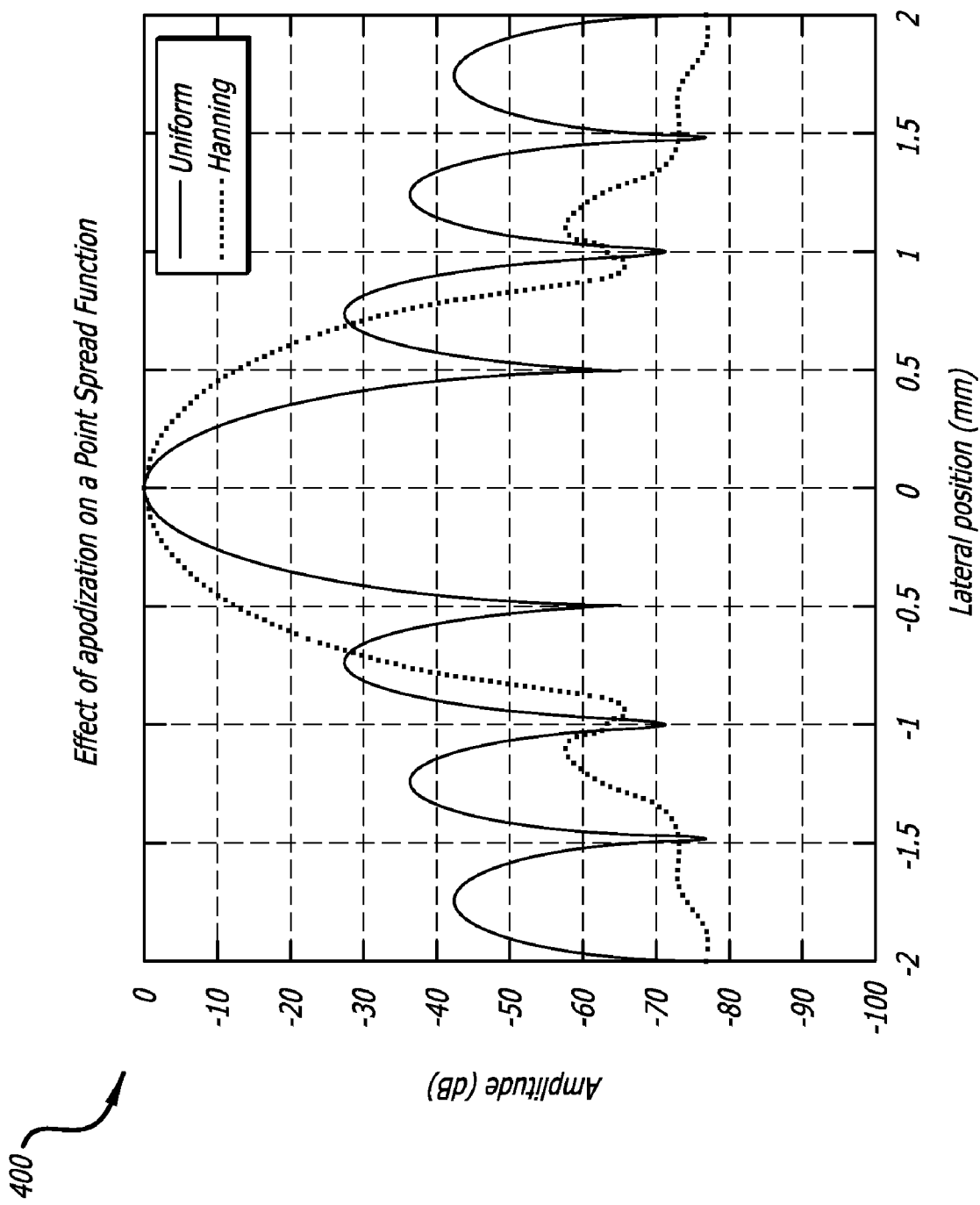
FIG. 4 depicts a graph of Uniform and Hanning weighted apertures in continuous wave (CW) mode, in accordance with exemplary embodiments of the present disclosure.

FIG. 4 depicts a graph 400 of Uniform and Hanning weighted apertures in continuous wave (CW) mode. A first choice was to use a pair of apodization functions that are common in ultrasound imaging practice. An aperture with a uniform amplitude weighting or a rect apodization function gives a sinc function shaped beam. This leads to sidelobes at −26 dB. With an apodization function smoother than uniform apodization such as Hanning apodization, the sidelobe level is lowered from −26 dB to −57 dB but has a larger −6 dB beamwidth compared to uniform weighting (FIG. 4). The Hanning window, given in Eq. 3, infra, is a special case of generalized raised cosine windows with n the element number, N the total number of elements in the aperture:

$$w(n) = \cos^2\left(\frac{n}{N}\pi\right) = 0.5\left(1.0 + \cos\left(\frac{2n}{N}\pi\right)\right) \quad \text{(Eq. 3)}$$

The trade-off between mainlobe width and sidelobe level can be circumvented by axially cross-correlating segments of RF data from the two data sets obtained using these two apodization methods. The RF signals in the sidelobes of the beamformed point target image of these two data sets are quite different, giving near zero or negative cross-correlation values. The cross-correlation coefficient at each image sample is calculated. After thresholding, this matrix becomes the weighting matrix which can be multiplied to the combined RF data at each sample.

Figure 5:
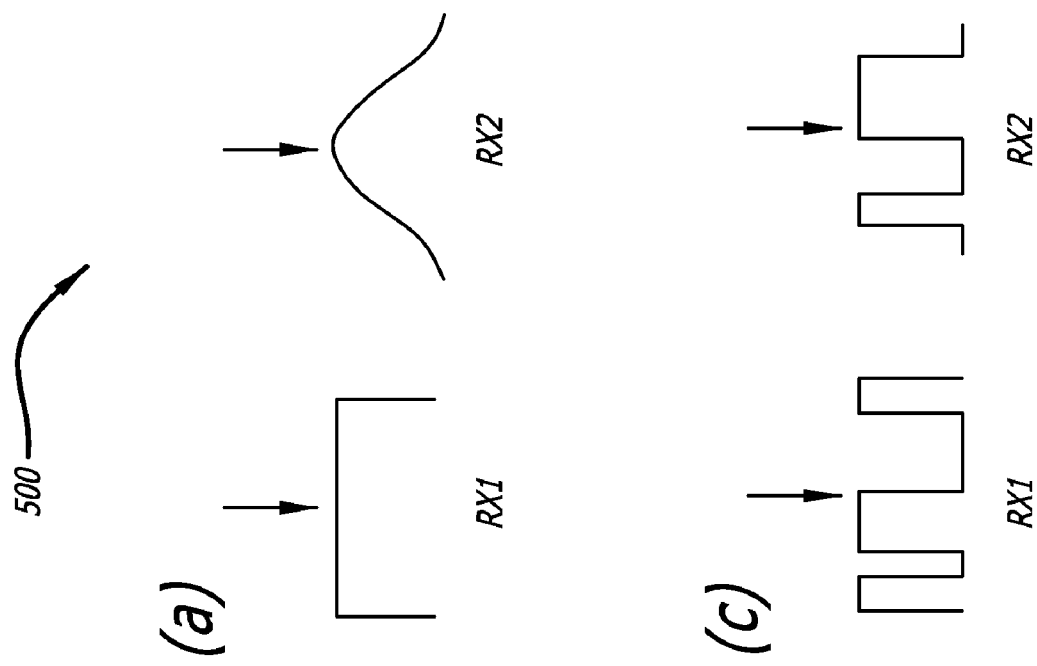
FIG. 5 depicts various aperture weighting functions for four pairs of receive apertures used with DAX: (a) Uniform and Hanning, (b) Common midpoint, (c) Random, and (d) Alternating pattern, in accordance with exemplary embodiments of the present disclosure.

FIG. 5 depicts various aperture weighting functions for four pairs of receive apertures used with DAX: (a) Uniform and Hanning, (b) Common midpoint, (c) Random, and (d) Alternating pattern. In FIG. 5, all algorithms use a common uniform transmit aperture. The lateral location of the focus is marked with the arrow. The inter-element distance or pitch is one wavelength. FIG. 5a shows two apertures where the first receive aperture has a uniform weighting, and where the second receive aperture has a Hanning apodization FIG. 5B. Apodization Scheme 2: Common Midpoint The next pair of apodization functions to be investigated is two uniformly weighted apertures that have a fractional translation of the active subaperture. The speckle patterns obtained from the two apertures with a large number of common elements are still well correlated. This cross-correlation will decrease in the clutter region due to a steering of the sidelobes in opposite directions. The degree of steering or the amount of decorrelation will depend on the number of elements translated.

This design is demonstrated first using a simple 1×8 linear array shown in FIG. 5b. The main idea is that an equal amount of steering in opposite directions is purposely introduced. With a desired focused subaperture of 8 elements, only the first 6 elements or from channel 1 to 6 are activated for the first data set. This first image is a steered version of the standard beamformed image. Then, another set of data is acquired using the latter 6 elements, or from channel 3 to 8. The second image will also be a steered version of the standard beamformed image. The mainlobes will still be well cross-correlated with each other, but the sidelobes and the clutter portions are less correlated with each other. By calculating the cross-correlation coefficient at each image sample, this matrix becomes the "weighting factor" which can be multiplied to the minimum of the two images. For the simulation and experiment, a 64 element subaperture was used with an 8 element translation. With an 8 element translation or 14% translation, the speckle correlation obtained from the two apertures was expected to be roughly 0.98. However, in the cystic region dominated by clutter and sidelobes, the cross-correlation was expected to be lower.

FIG. 5C. Apodization Scheme 3: Randomly Selected Aperture

In this scheme, by randomly selecting the two receive apertures with no common elements, a similar mainlobe with quite different clutter can be obtained. Since the two receive apertures are sparse, high clutter levels are expected where the amplitude of the clutter will depend on the sparseness of each aperture. For embodiments of the present disclosure, four different permutations were done in a point target simulation and the best random sparse aperture in terms of beamwidths and sidelobe level was chosen for subsequent cyst simulations and experiments. In FIG. 5c, a simple 1×8 linear array is used to demonstrate the two receive apertures. Four random elements are selected to receive for the first data set. Then for the second data set, unused elements from the first case are used. The cross-correlation coefficient at each image sample is calculated to generate a matrix and this matrix becomes the weighting factor. This is multiplied to the sum of the two images which is the standard beamformed image with uniform receive apodization.

FIG. 5D. Apodization Scheme 4: Alternating

In this scheme, the first receive aperture has alternating elements enabled. The second receive aperture will use the alternating elements that are not used in the first receive aperture. With these two apodizations, grating lobes were purposely constructed that are 180 degrees out of phase with each other. Then, by using cross correlation one can distinguish between signals coming from a mainlobe and clutter signals. In the scheme of one embodiment of the present disclosure, signals with cross-correlation coefficients less than 0.001 are multiplied by 0.001 or reduced by 60 dB. Echoes with higher cross-correlation coefficients have more mainlobe signal and are multiplied by the cross-correlation coefficient.

FIG. 5d is an illustration of a pair of receive apertures with a pitch of one wavelength λ. RX1 uses an alternating pattern of 2 elements on, 2 elements off. RX2 uses the opposite alternating pattern of 2 elements off, 2 elements on. These receive apertures are essentially sparse arrays with a four wavelength pitch. Thus, grating lobes are expected to be present in the PSF. The location of the nth grating lobe is given by the following equation:

$$\theta_n = \sin^{-1}\left(\frac{n\lambda}{d}\right) \quad (Eq.\ 3)$$

where n is the nth grating lobe, λ is the ultrasound wavelength, and d is the inter-element distance or pitch. The cross-correlation coefficient at each image sample is calculated to generate a matrix, and this matrix becomes the weighting factor. By summing data from these two receive apertures, the same data is obtained as from a uniformly weighted receive aperture. This RF data will then be weighted by the cross-correlation matrix. Instead of a 2-element alternating pattern as shown, any N-element alternating pattern can be used where N is less than half of the number of elements in the subaperture. The main difference between these configurations will be the location of the grating lobe. Increasing N will move the grating lobes closer to the mainlobe.

Methods

Computer simulations were performed using Field II to generate lateral beamplots for all four designs of FIG. 5. A 5 MHz Gaussian pulse with 50% bandwidth was used as the transmit pulse and a delta function as the element impulse response.

For a point target simulation, an RMS energy value was calculated from the received voltage trace. All RMS energy values were converted to decibels after normalizing to the maximum energy level. The transmit and receive focus was fixed at 30 mm for the point target simulation. Since there is rarely a point target in a clinical environment, simulations were performed using a cylindrical 3 mm diameter anechoic cyst located at 30 mm depth embedded in a 3-D phantom of scatterers. The parameters for the simulation are listed in Table 1.

TABLE 1

1 × 128 Linear Array and Imaging Parameters

| Parameter | Value | |
|---|---|---|
| Number of elements in subaperture | 64 | |
| Center Frequency | 5 | MHz |
| Bandwidth | 50% | |
| Azimuthal element Pitch | 308 | μm |
| Elevation Element Height | 5 | mm |
| Sound speed | 1540 | m/s |
| Transmit Focus | 30 | mm |
| Lateral beam spacing (beamplot simulation) | 30 | um |
| Lateral beam spacing (cyst) | 150 | um |
| Receive focal delay step (cyst) | 0.1 | mm |

For an experimental setup, individual element RF signals were collected for off-line processing from an ATS spherical lesion phantom (ATS laboratories, Bridgeport, Conn., Model 549) containing a 3 mm anechoic cyst using an Ultrasonix Sonix RP ultrasound system (Ultrasonix Medical Corporation, Richmond, BC, Canada) having 40 MHz sampling frequency. This system has great flexibility allowing the researcher to control parameters such as transmit aperture size, transmit frequency, receive aperture, filtering, and Time-Gain Compensation. In this experiment, a 128-element, 300 μm pitch, L14-5/38 linear array was used. A 1-cycle transmit pulse of 5 MHz and an f-number=1.5 was used. In receive, element data was collected and receive beamforming was done off-line using Matlab (The MathWorks, Inc. Natick, Mass.). Dynamic receive focusing was used with focal updates every 0.1 mm. The image line spacing is 150 μm. Data from each channel was collected 32 times and averaged to minimize effects of electronic noise.

In an experimental setting as describe above, an analog RF signal is digitized with a sampling frequency of 40-60 MHz. Additional simulations were done with 40 MHz delay quantization in transmit and receive beamforming to model one experimental setup. This introduces delay quantization error and gives us a better understanding of how DAX performs on a commercially available system.

All signals in the experiments are bandpass filtered using a 63-tap finite impulse response (FIR) bandpass filter with frequency range limited to the −6 dB bandwidth of the transducer. After the signals are bandpass filtered, delayed, apodized and summed to create RX1 and RX2, the two sets of data are cross-correlated. The cross-correlation value is sent to a thresholding operator. If the value is less than or equal to ϵ, or 0.001 in one embodiment, then the value is replaced with 0.001. If it is greater than 0.001, then the value remains unchanged. A second filter, which has the same passband window as the first filter, might be required to reduce sharp discontinuities in images that might be caused by multiplication of the weighting matrix. The Hilbert transform is used for envelope detection, and all images are displayed on a log scale.

In the randomly selected aperture scheme, the two data are "mirrored" versions of each other giving a 180 phase shift approximately. In the alternating pattern scheme, it can also be clearly seen that the two grating lobe regions are basically 180 out of phase with respect to each other. Although perhaps counterintuitive, using a larger alternating pattern can result in a better beam with DAX since the grating lobes here are beneficial since they narrow the beam particularly down at the −40 to −60 dB level. Cross-correlating these two signals would yield a cross-correlation coefficient near −1 and therefore a reduction of 60 dB in magnitude. The weighting matrix will be applied to the sum of these data sets.

TABLE 2

Comparison of Beamwidths and Clutter Levels of the four designs

|  | Standard | Uniform-Hanning | Common Midpoint | Randomly Selected | Alternating Pattern |
| --- | --- | --- | --- | --- | --- |
| −6 dB (mm) | 0.46 | 0.40 | 0.35 | 0.46 | 0.45 |
| −20 dB (mm) | 0.80 | 0.89 | 0.79 | 0.81 | 0.79 |
| −40 dB (mm) | 2.67 | 0.99 | 1.00 | 1.89 | 2.05 |
| −60 dB (mm) | 8.58 | 1.08 | 1.92 | 2.12 | 2.20 |
| Residual Sidelobes | Clutter | <−80 | <−60 | <−60 | <−100 |

Results

A. Point Target Simulation

Figure 6:
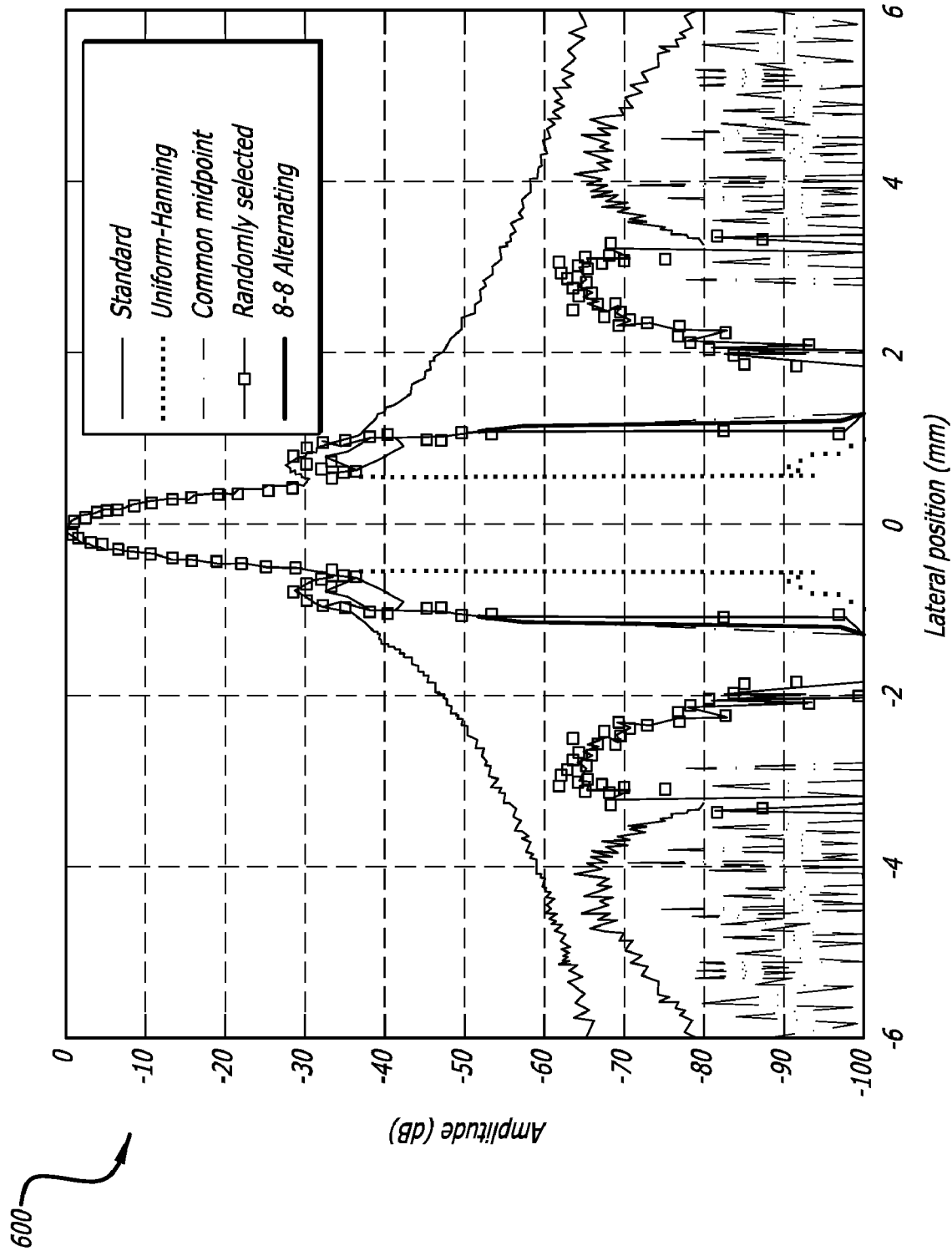
FIG. 6 shows a plot of simulated lateral beamplots using Field II of a standard transmit/receive beam with uniform weighting compared to the four DAX schemes.
Figure 7A:
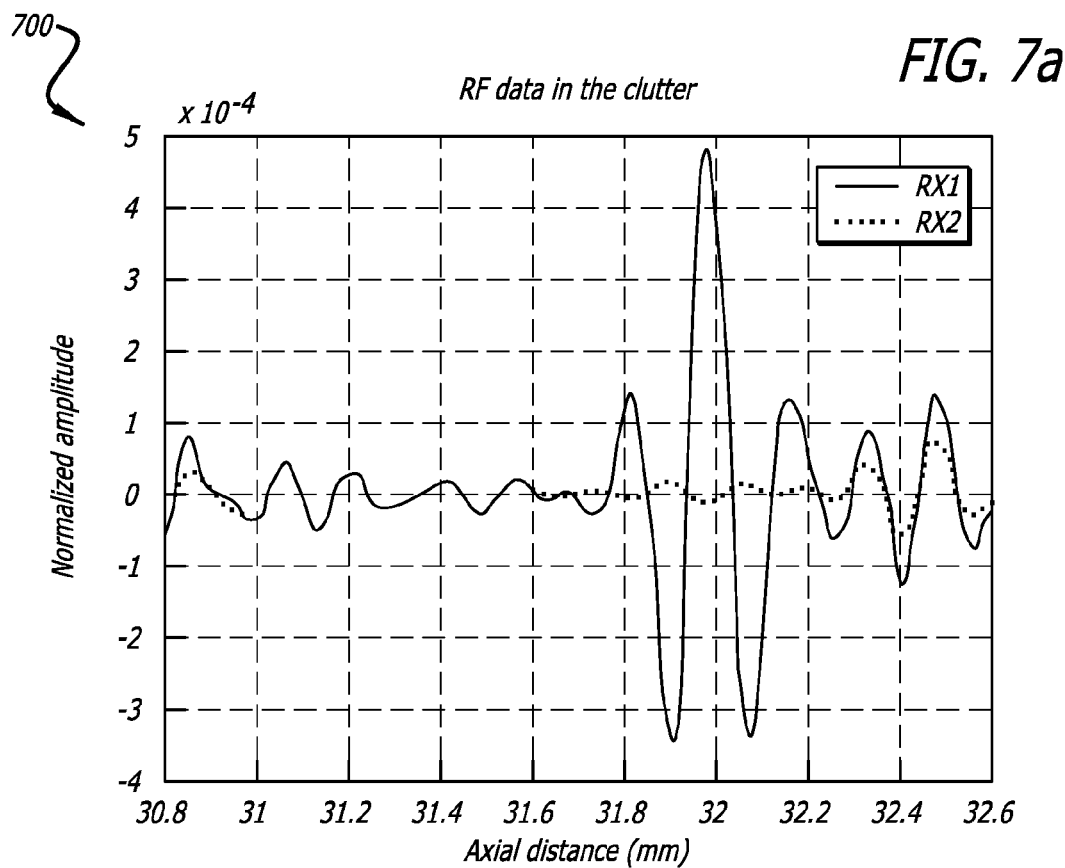
FIG. 7. depicts a combined plot of RF data in the clutter region, comparing four DAX schemes, (a) Uniform-Hanning scheme, (b) Common midpoint scheme, (c) Randomly selected aperture scheme, and (d) Alternating pattern scheme, with standard beamformed data with uniform apodization, in accordance with exemplary embodiments of the present disclosure.
Figure 7B:
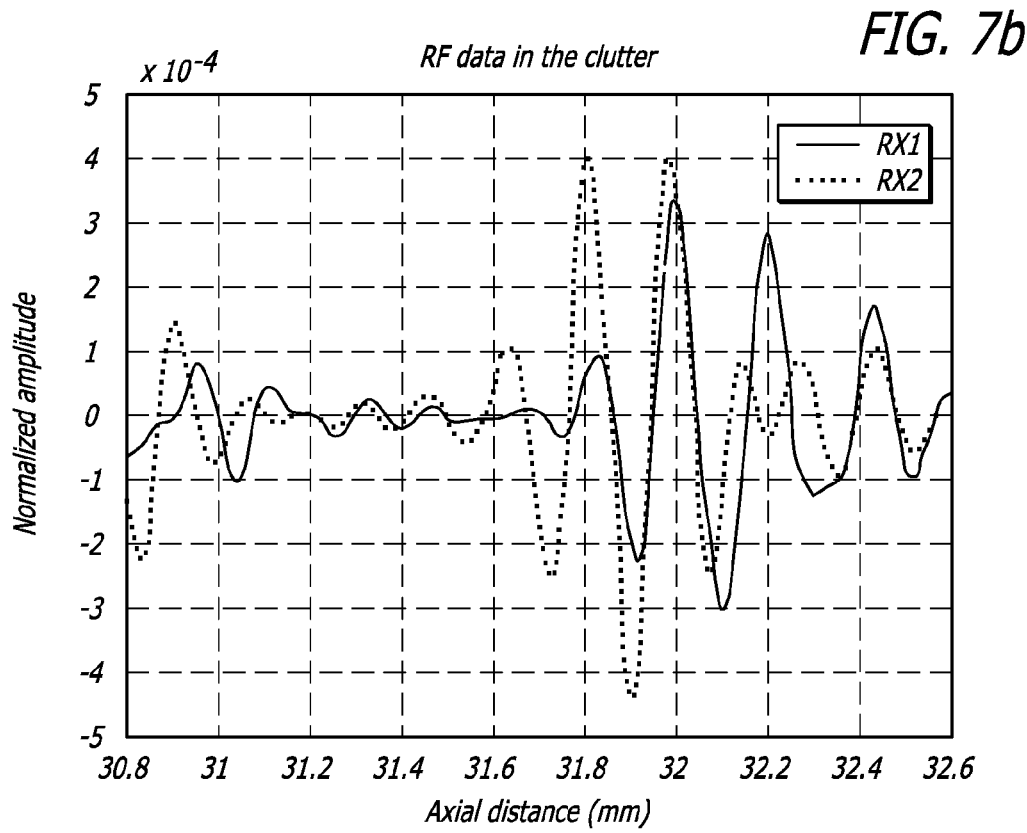
Figure 7C:
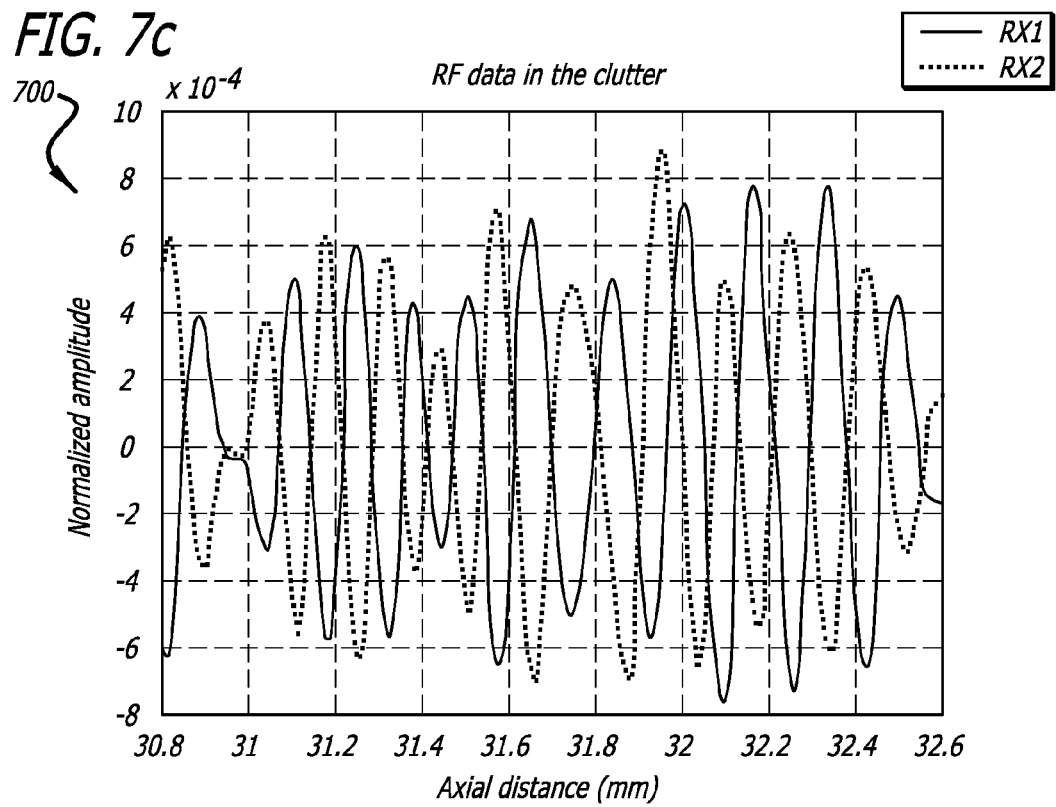
Figure 7D:
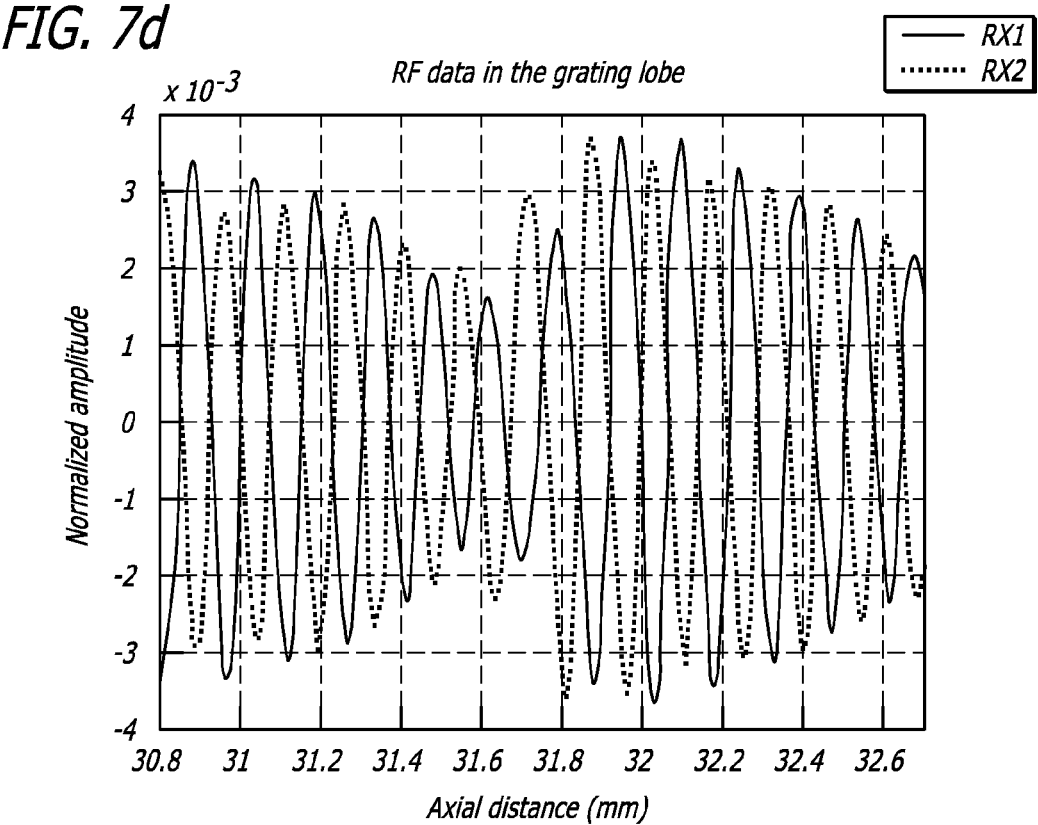
Figure 10A:
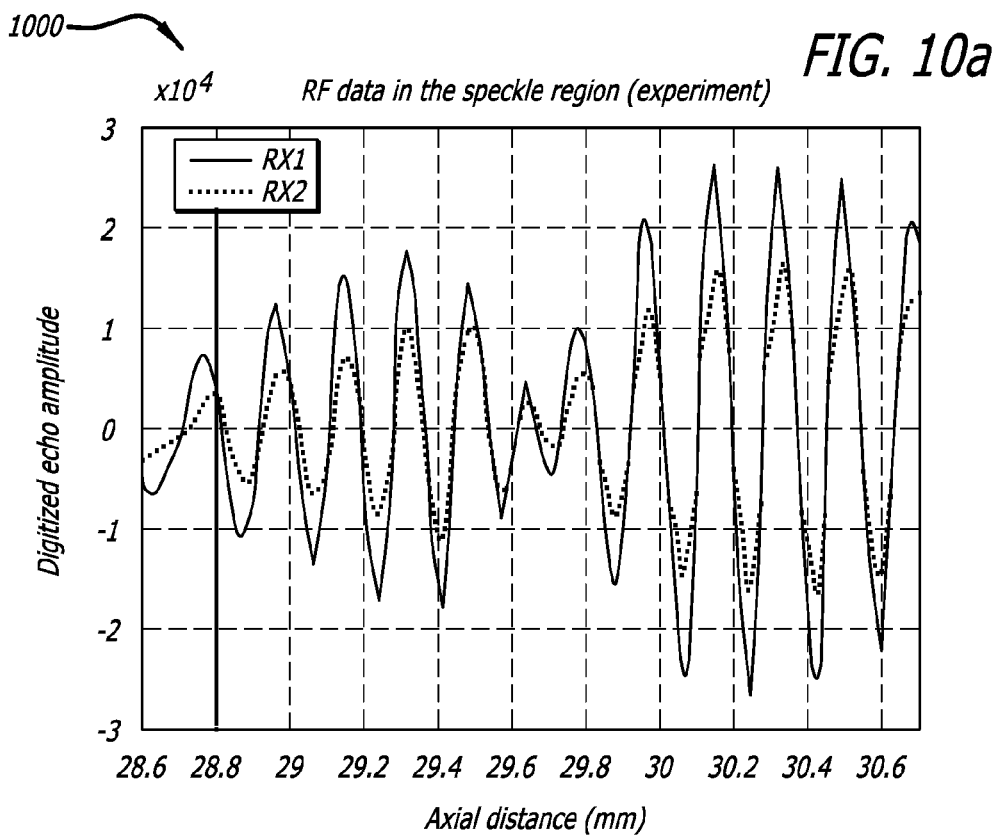
FIG. 10 depicts a combined plot 1000 that shown Experimental RF data in the speckle and cyst regions with (a), (b) Uniform-Hanning scheme (c), (d) common midpoint scheme (e), (f randomly selected aperture scheme and (g), (h) alternating scheme, in accordance with an exemplary embodiment of the present disclosure.
Figure 10B:
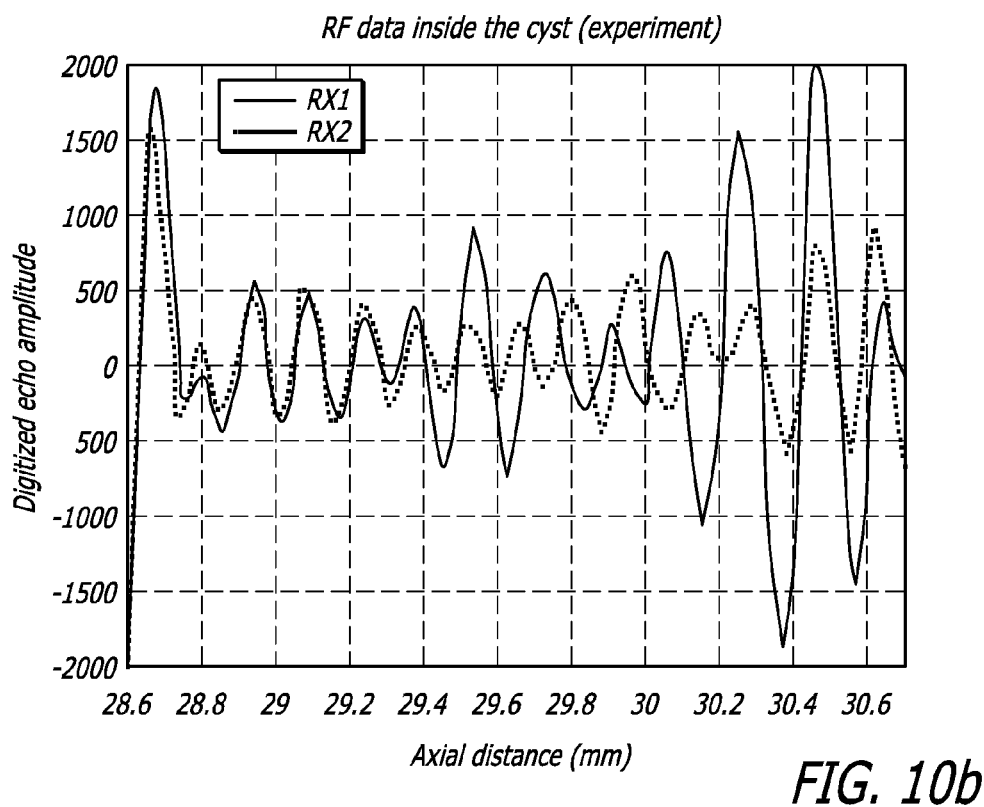
Figure 10C:
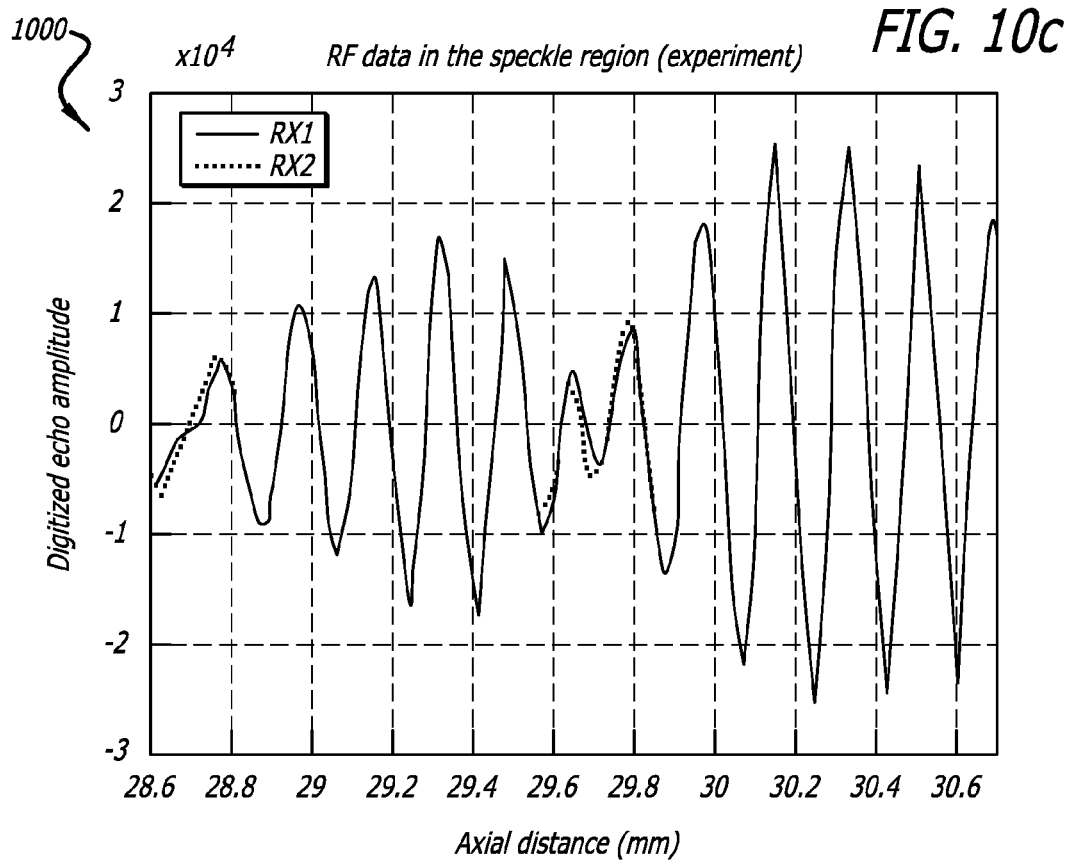
Figure 10D:
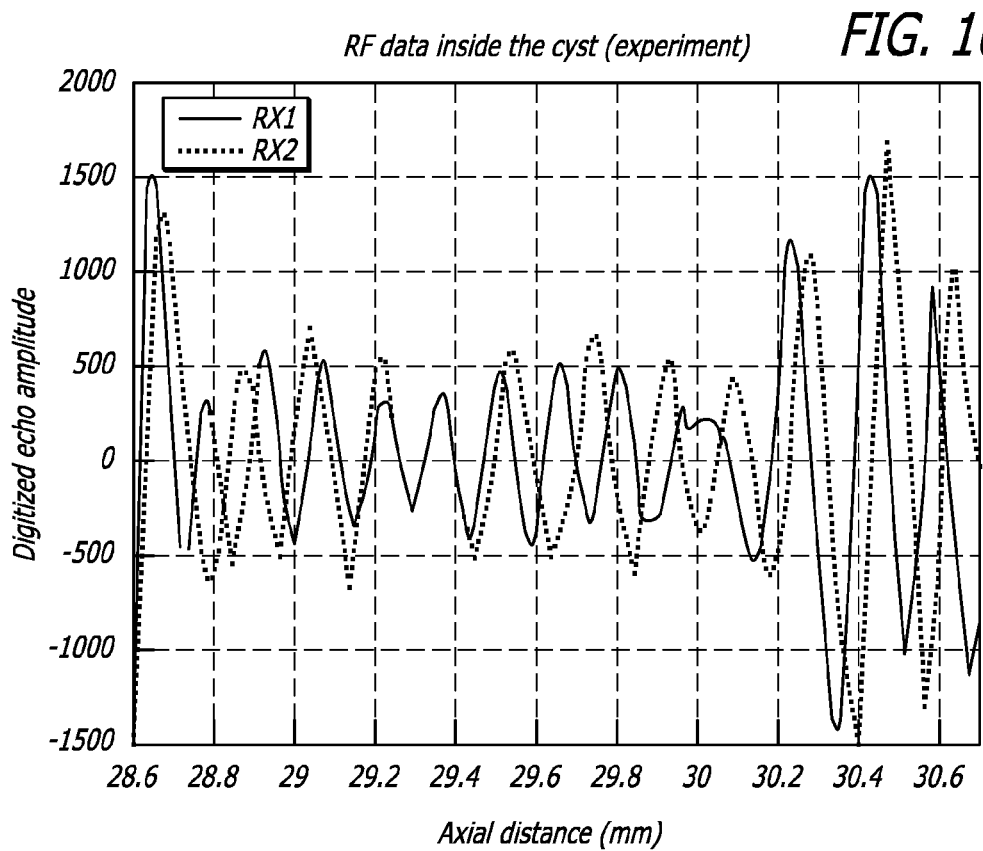
Figure 10E:
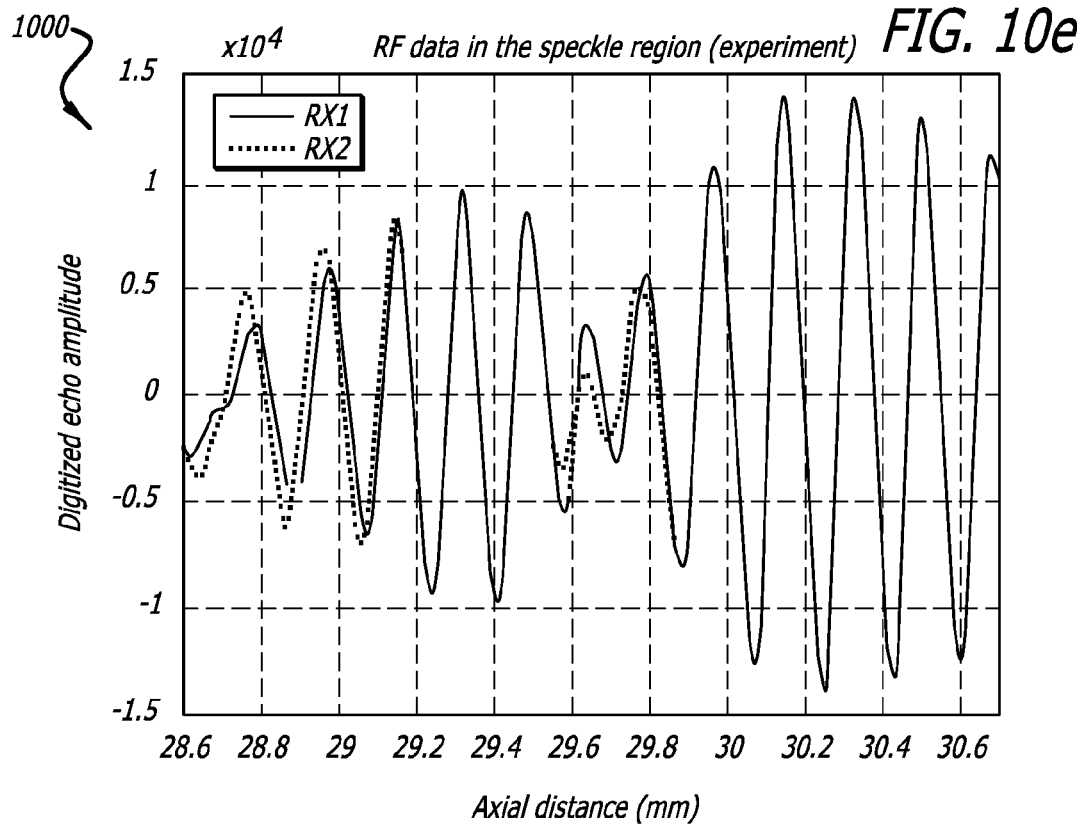
Figure 10F:
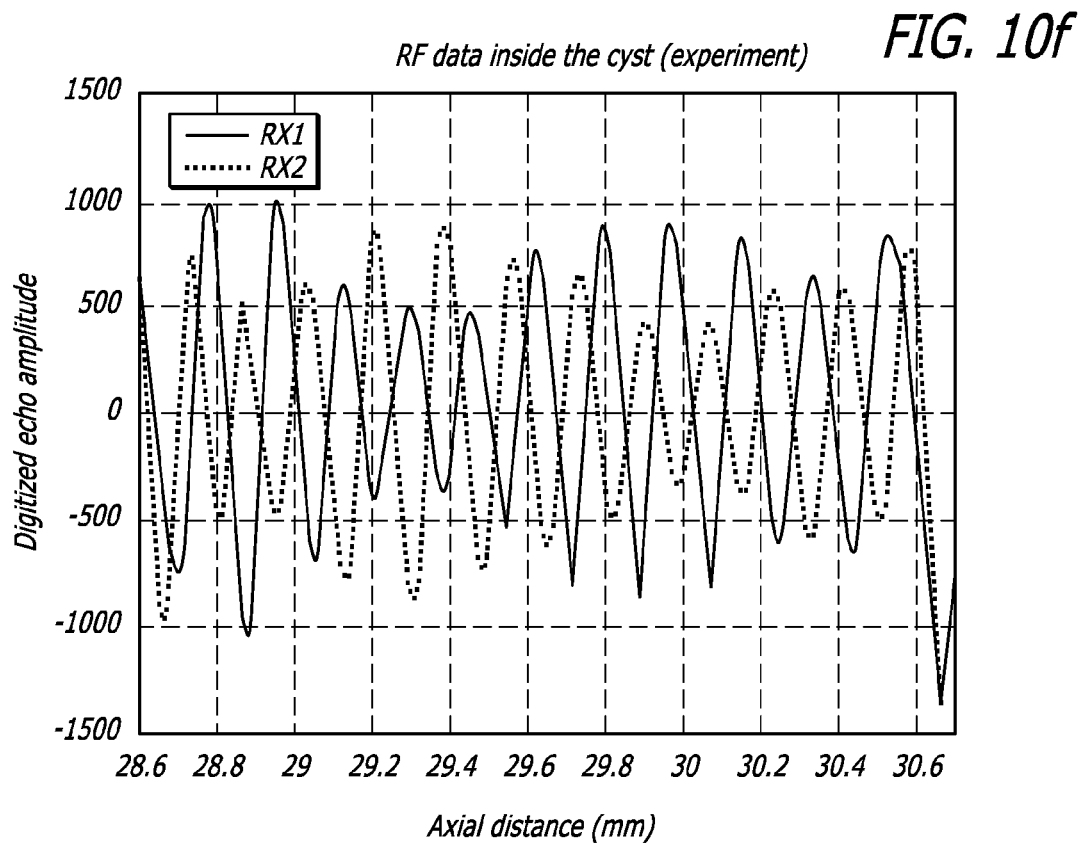
Figure 10G:
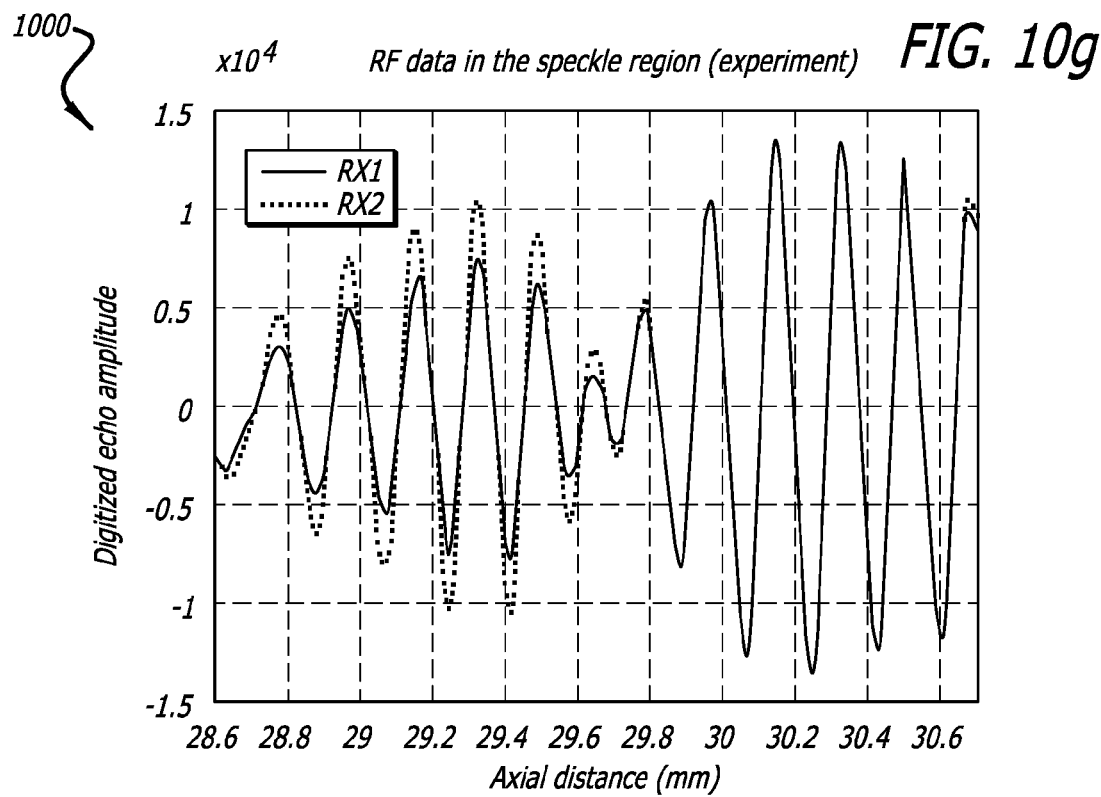
Figure 10H:
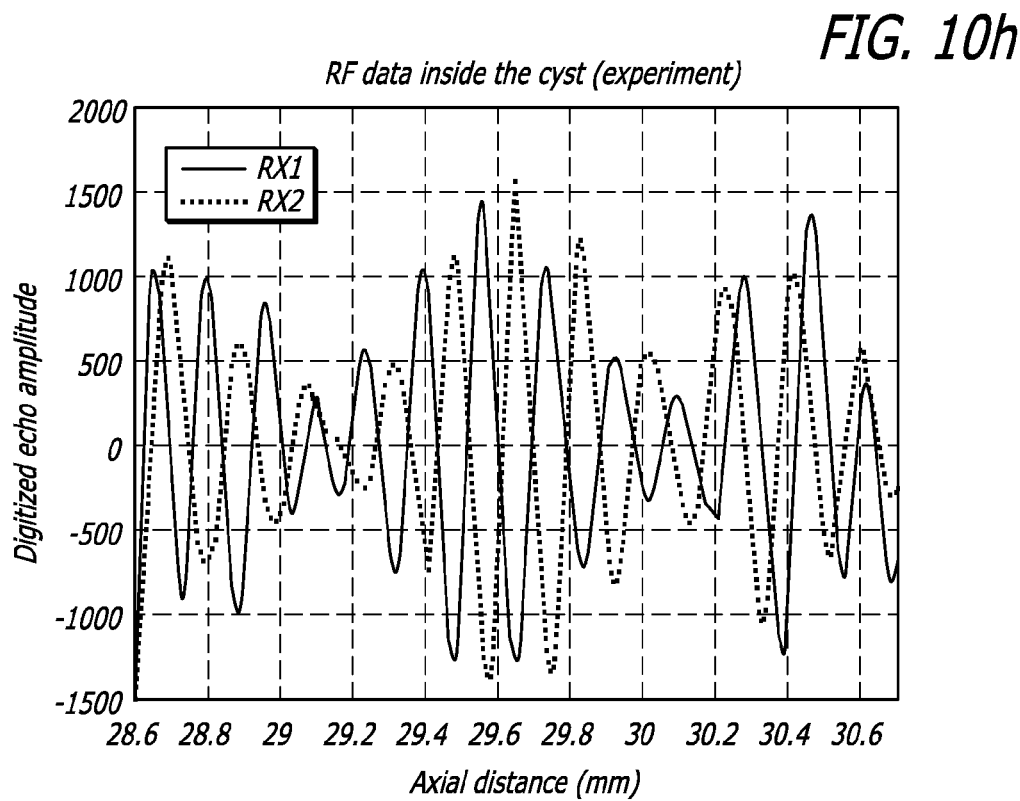

FIG. 6 shows a plot 600 of simulated lateral beamplots using Field ii of a standard transmit/receive beam with uniform weighting compared to the four DAX schemes of FIG. 5. The beamplots of all four methods have mainlobe widths basically equal to the mainlobe of the uniform apodization. At the same time, clutter near the mainlobe has dropped dramatically down to below −100 dB for all four methods. The −6, −20, −40, and −60, dB beamwidths are listed in Table 2. The −6 and −20 dB beamwidths are similar for all cases. For the uniform-Hanning and common midpoint schemes, the −6 dB beamwidths are 0.40 and 0.35 respectively or 11% and 24% smaller compared to the standard beamformed case. For the uniform-Hanning case, only portions of the two mainlobes are well correlated. For the common midpoint scheme, the two beams are steered and the overlap of the two beams is smaller than in random or alternating pattern schemes. Thus, having a cross-correlation value of slightly less than 1 and by multiplying this value by the minimum of the two data sets, the mainlobe width or the −6 dB beamwidth is narrower than in standard beamformed case. The −40 dB and −60 dB widths are also narrowest for uniform-Hanning and common midpoint schemes. The −6 dB beamwidths for the randomly selected aperture and the alternating pattern are the same as the beamwidth for the case of standard beamforming.

FIG. 7. depicts a combined plot 700 of RF data in the clutter region, comparing comparing four DAX schemes, (a) Uniform-Hanning scheme, (b) Common midpoint scheme, (c) Randomly selected aperture scheme, and (d) Alternating pattern scheme, with standard beamformed data with uniform apodization. FIG. 7 shows the RF data inside the clutter and grating lobe regions for RX1 and RX2 for the four DAX schemes. It is interesting to note the effect of different apodizations on the clutter and grating lobe regions. For the uniform-Hanning apodization scheme, it is shown that the amplitude of a Hanning apodized receive aperture is about 30 dB lower than the amplitude of a uniformly apodized receive aperture. With the common midpoint scheme, the two RF data are shifted by about 1 wavelength with respect to each other.

B. Cyst Simulation

It is important to remember that the proposed algorithms are spatially varying and target-dependent. Therefore, although beamplots or PSFs are more intuitive, they are not exactly indicative of imaging performance for diffuse scatterers such as biological tissue.

FIG. 8 shows a combined plot 800 of simulated images of a 3 mm diameter anechoic cyst with standard beamforming with uniform apodization, Hanning apodization and the four DAX schemes, to further test the performance of the above-referenced algorithms. To quantify improvement, the CNR for each of the images was calculated. CNR is defined as the difference between the mean of the background and the cyst in dB divided by the standard deviation of the background in dB, $$CNR = \frac{\bar{S}_t - \bar{S}_b}{\sigma_b}, \quad \text{(Eq. 3)}$$

where is the mean of the target, is the mean of the background and is the standard deviation of the background. Signals coming from the speckle region are dominated by the mainlobe, thus giving a cross-correlation coefficient near 1. In the case of an anechoic cyst where the signal contribution from the mainlobe will be small, the sidelobes and grating lobes will be dominant giving a very low or negative cross-correlation value.

The CNRs for the six images of FIG. 8 are 5.24, 6.85, 12.62, 12.92, 7.44, and 11.28 for standard beamforming with uniform apodization, Hanning apodization, uniform-Hanning, common midpoint, randomly selected and alternating pattern respectively. Regions used to calculate CNR are shown in the white and black rectangles for the target and background respectively. The figures are shown with 80 dB dynamic range. Qualitatively, the cyst using uniform weighting is most difficult to see, as shown in FIG. 8(a).

Using Hanning apodization, the cyst has a better contrast but the speckle size is larger due to a widened mainlobe, as shown in FIG. 8(b). Using DAX processing, the cyst becomes more visible without affecting the mainlobe resolution, as shown in FIGS. 8(c)-(f).

With continued reference to FIG. 8, the uniform-Hanning approach shows a dark cyst with a well defined boundary. This approach gives the highest CNR when multiplying the cross-correlation matrix with Hanning apodized data. In fact, multiplying by the minimum of the two data sets lowered the CNR below 10. The common midpoint approach shows a darker cystic region but the left and right edges show clutter. The amplitude of the clutter region is around 60 dB below the peak signal in the image. The randomly selected aperture approach also shows a darker cyst with some clutter. The alternating pattern approach performs as well as uniform-Hanning apodization scheme.

All of the DAX schemes create some dark "pits" in the speckle region due to the randomness of the speckle. Methods to reduce these artifacts will be discussed later.

C. Cyst Experiment

FIG. 9 shows a combined plot 900 of the result from the cyst experiment using the Ultrasonix Sonix RP system and ATS tissue-mimicking phantom containing a 3 mm diameter anechoic cyst. The images are displayed with a 55 dB dynamic range after delay and sum beamforming, digital bandpass filtering, envelope detection and log-compression.

The target region is marked with a white rectangle and the background region is marked with a black rectangle in the first image.

Qualitatively, the cyst using standard beamforming with uniform apodization is the most difficult to see, as shown in FIG. 9(*a*). Using Hanning apodization, there is some improvement in CNR, and the speckle size is larger due to a widened mainlobe, as shown in FIG. 9(*b*). The uniform-Hanning, common midpoint, random all have some amount of "fill in". The alternating pattern has the highest CNR at 11.64 compared to 5.23, 5.56, 7.02, 7.11, 11.39 for uniform, Hanning, uniform-Hanning, common midpoint, and random cases respectively. These CNR values are in very good agreement with the simulation results except for the Hanning apodization and uniform-Hanning scheme. This issue will be discussed in section D.

FIG. 10 depicts a combined plot 1000 that shown Experimental RF data in the speckle and cyst regions with (a), (b) Uniform-Hanning scheme (c), (d) common midpoint scheme (e), (f randomly selected aperture scheme and (g), (h) alternating scheme. FIG. 10 shows experimental RF data from speckle region (left column) and inside the cyst (right column). In the speckle region, the waveforms from RX1 and RX2 are very similar yielding a cross-correlation coefficient near 1. For the cyst region, with uniform-Hanning scheme, the amplitude for Hanning apodized data, as shown in FIG. 10(*b*) RX2, is smaller than uniformly apodized data, as shown in FIG. 10(*b*) RX1. However, two sets of RF data are still correlated, and this fact does not agree with one set of point target and cyst simulation results.

For the common midpoint scheme, as shown in FIG. 10(*d*), the two RF data are shifted relative to each other, but not as dramatically as in the simulation. For the randomly selected aperture, as shown in FIG. 10(*f*), and alternating pattern scheme, as shown in FIG. 10(*h*), the waveforms appear nearly 180° out of phase resulting in negative cross-correlation coefficients. Note that graphs in the left column of FIG. 10 are not on the same vertical scale as the graphs on the right column and that the echo magnitude inside the cyst is about 30 or 40 dB lower than the magnitude in the speckle region.

Figure 11:
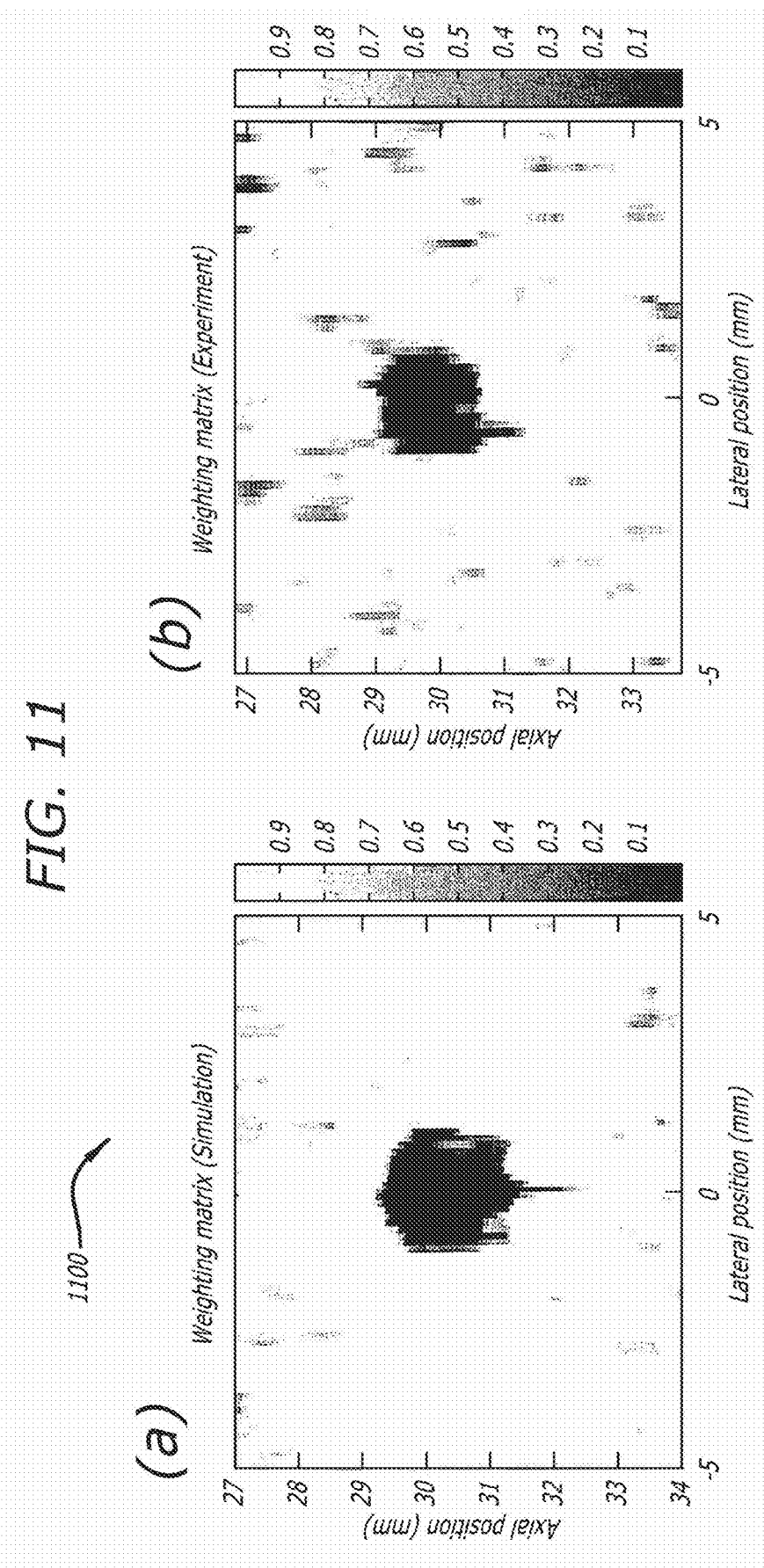
FIG. 11. depicts a combined plot 1100 of the weighting matrix used for DAX 8-8 alternating pattern in a) simulation, b) experiment in linear scale. Color bar shows the range of cross-correlation coefficients, in accordance with an exemplary embodiment of the present disclosure.
Figure 12A:
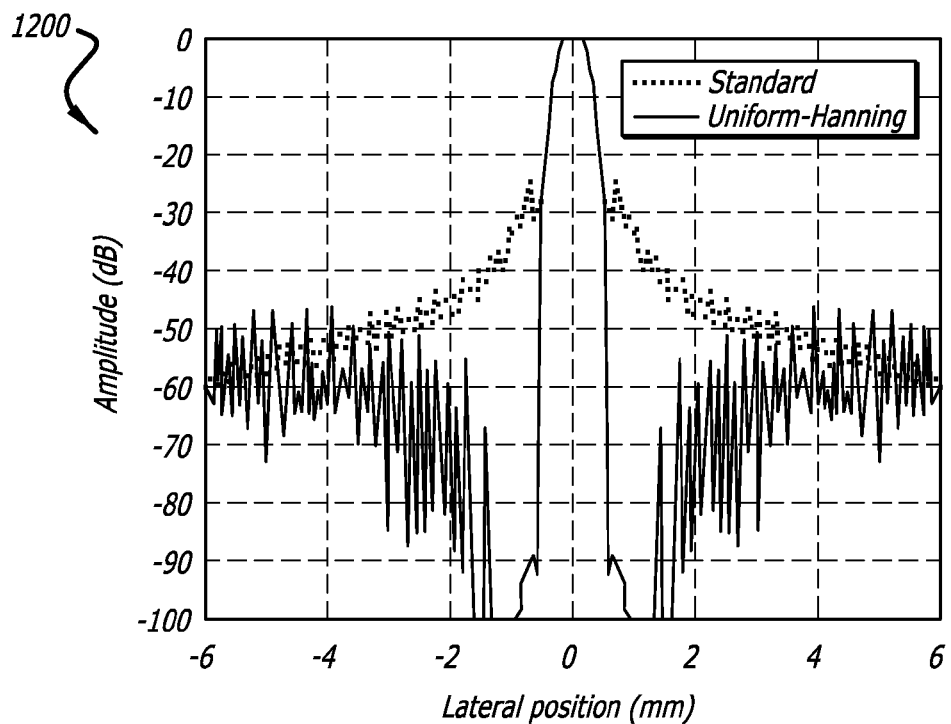
FIG. 12 depicts a combined plot 1200 of Lateral Beamplots comparing 4 DAX schemes with standard beamformed data with 40 MHz quantization.
Figure 12B:
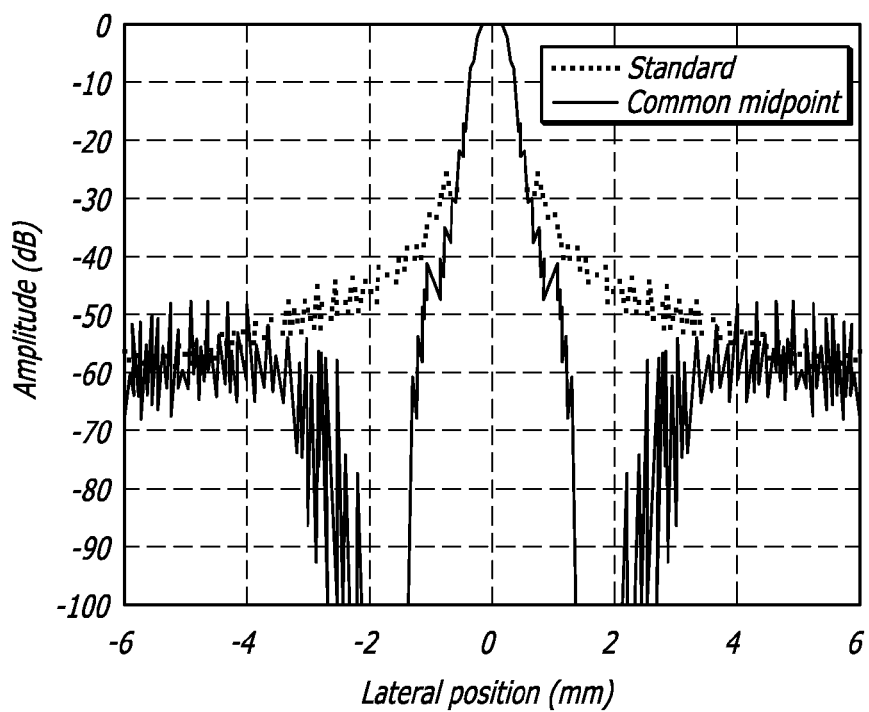
Figure 12C:
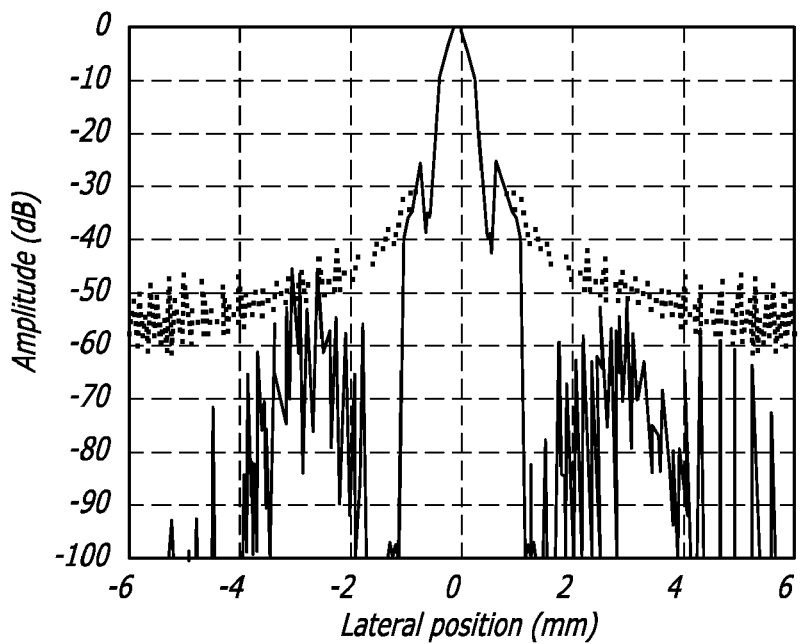
Figure 12D:
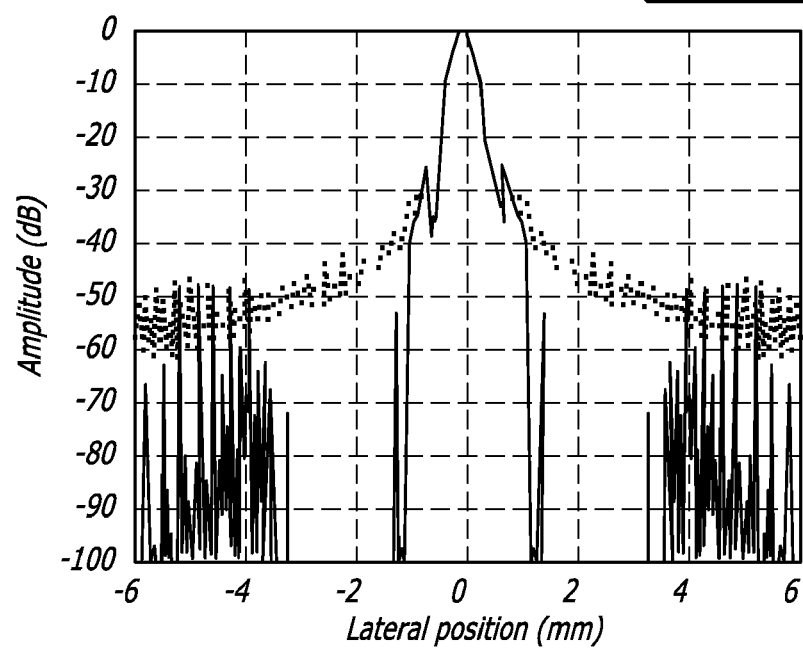

FIG. 11. depicts a combined plot 1100 of the weighting matrix used for DAX 8-8 alternating pattern in a) simulation, b) experiment in linear scale. Color bar shows the range of cross-correlation coefficients. FIG. 10 shows the weighting matrices after the thresholding operation used for simulation and for the experiment using the DAX alternating pattern scheme. All cross-correlation values less than 0.001 were replaced with 0.001 to create the final weighting matrix. The cyst is clearly visible in the weighting matrix and the CNR values are 19.98 for simulation and 14.43 for experiment. Therefore, it may be possible to use these matrices as cross-correlation based images to locate a target, but this requires further investigation.

D. Simulation with 40 MHz Quantization

The disparity between the CNRs of the simulated cyst and experimental cyst was further investigated with Field II simulations having 40 MHz quantization.

FIG. 12 depicts a combined plot 1200 of Lateral Beamplots comparing 4 DAX schemes with standard beamformed data with 40 MHz quantization. In FIG. 12, the standard beamformed PSF is compared with (a) uniform-Hanning scheme, (b) common midpoint scheme, (c) random scheme, and (d) the alternating pattern scheme.

Figure 13:
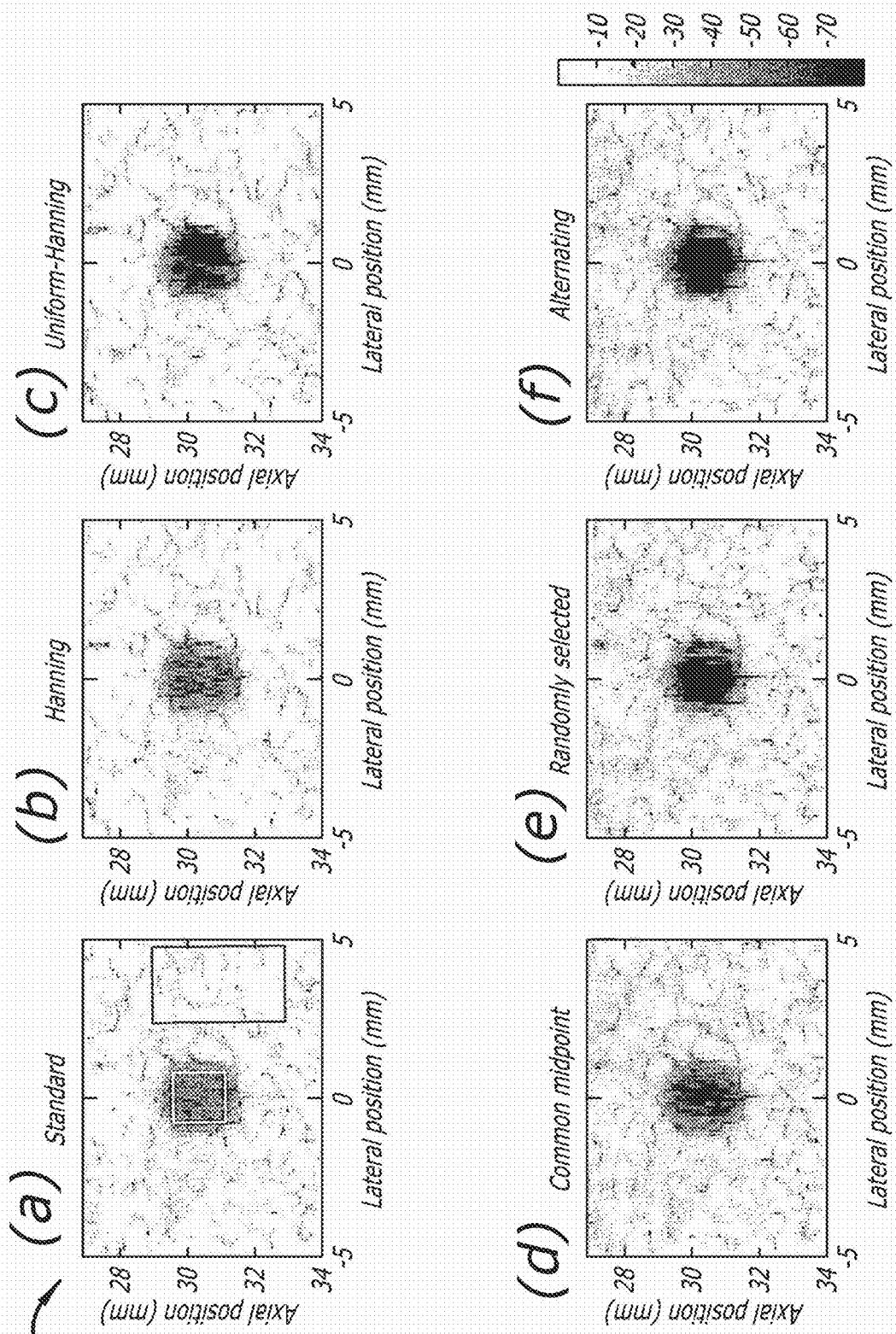
FIG. 13 depicts a combined plot 1300 of a cyst simulation with 40 MHz quantization (a) Standard beamformed with uniform apodization (b) Hanning apodization (c) Uniform-Hanning (d) Common midpoint (e) Randomly selected (f Alternating pattern, in accordance with an exemplary embodiment of the present disclosure.

FIG. 13 depicts a combined plot 1300 of a cyst simulation with 40 MHz quantization (a) Standard beamformed with uniform apodization (b) Hanning apodization (c) Uniform-Hanning (d) Common midpoint (e) Randomly selected (f Alternating pattern. The CNR values are (a) 5.39, (b) 6.45, (c) 10.45, (d) 7.34, (e) 11.03 and (f) 12.53 respectively.

The integrated lateral beamplots are shown in FIG. 12 and a cyst simulation with 40 MHz quantization is shown in FIG. 13. Using standard beamforming with uniform apodization, the anechoic cyst still shows some "fill in" due to clutter. The CNRs are 5.39, 6.45, 10.45, 7.34, 11.03, 12.53 for standard beamforming, Hanning apodization, uniform-Hanning common-midpoint, randomly selected and alternating pattern respectively.

The effect of quantization is most prominent in the uniform-Hanning scheme. This can be explained considering quantization error as essentially a focusing error. In the other three apodization schemes, some or all elements in the receive aperture are different. Therefore if there are any focusing or quantization errors, each aperture sees different error contributions which are poorly correlated. However in the uniform-Hanning scheme, both apertures will be equally affected by any quantization errors introduced. These errors would be highly correlated. Table 3 summarizes the CNR values for two cyst simulations and experiment.

TABLE 3

| | CNR values of the four designs | | | | | |
|---|---|---|---|---|---|---|
| | Standard | Hanning | Uniform-Hanning | Common Midpoint | Randomly Selected | Alternating |
| CNR (simulation) | 5.27 | 6.92 | 12.92 | 7.44 | 11.28 | 12.62 |
| CNR (experiment) | 5.23 | 5.56 | 7.02 | 7.11 | 11.39 | 11.64 |

TABLE 3-continued

CNR values of the four designs

|  | Standard | Hanning | Uniform-Hanning | Common Midpoint | Randomly Selected | Alternating |
|---|---|---|---|---|---|---|
| CNR (simulation with quantization) | 5.39 | 6.45 | 10.45 | 7.34 | 11.03 | 12.53 |

Conclusion

Dual Apodization with Cross-correlation (DAX) techniques that suppress sidelobes and lower clutter are described herein, which can provide for improved CNR, without compromising spatial resolution in ultrasound imaging. The main idea behind these techniques and methods is to use a pair of apodization schemes that are highly cross-correlated in the mainlobe but have low or negative cross-correlation in the sidelobe region. DAX uses two sets of beamformed data acquired with two different receive apertures and cross-correlates segments of RF data.

This cross-correlation matrix serves as a pixel-by-pixel weighting function which will be multiplied to the minimum or to the sum of the two data sets. Theory and simulation were validated in ultrasound tissue-mimicking phantoms where contrast improvement in terms of CNR was 139% in simulation and 123% experimentally. Lateral and axial resolution are not sacrificed to improve CNR. The alternating pattern showed the highest CNR experimentally. This alternating pattern purposely creates two sets of grating lobes which are 180 out of phase with respect to each other. While grating lobes have long been a potential source for clutter in ultrasound imaging, DAX uses gratings lobes to help distinguish between mainlobe and clutter signals.

Occasionally, DAX may add artificial dark spots in the speckle region. In fact, the DAX algorithm slightly lowers the speckle SNR, defined as the ratio of mean to standard deviation of the scattered signal for fully developed speckle, by 4-11%. The SNR in the speckle region before applying the DAX algorithm was 1.91. The SNR in the speckle region after the DAX algorithm was applied were 1.81, 1.70, 1.84 and 1.77 for Uniform-Hanning, Common midpoint, Random and Alternating pattern respectively. In cystic regions, it may be possible that clutter signals will have a high cross-correlation coefficient. In this situation, minimal or no improvement in contrast will be seen. The occurrence of both of these artifacts could be minimized by several straightforward options.

Using a moving average or median filter on the cross-correlation coefficients is one approach. Since this process is a smoothing of the weighting matrix, the speckle pattern is not smeared. A brief investigation was conducted on the effect of correlation window on the cyst. A longer correlation window produced a poorly delineated cyst but with fewer dark spots in the speckle region. If the window size was too small, the speckle had more pits due to greater variation in cross-correlation coefficients.

Empirically, 20-30 samples, which is roughly two wavelengths, performed best in terms of CNR. Lastly, the threshold and weighting as a function of p could be adjusted. All of these methods may help eliminate dark spots but may also lower CNR. Preliminary attempts with 1-D lateral cross-correlation gave a slightly lower CNR than using 1-D axial cross-correlation. 2D cross-correlation gave a comparable improvement to 1D axial cross-correlation but with increased computational load.

Simulation results of embodiments of the present disclosure have shown an improvement in CNR by 120% over a standard beamformed data and by 54% over a recently published side lobe suppression method. Experimental results were achieved for a fine grained sponge with an anechoic region of a diameter of 5 mm. Improvements were obtained in CNR of 171% over a standard beam formed data and 66% over a recently published method. Simulation has verified that techniques of the present disclosure can be used to improve contrast in the presence of phase aberration.

Accordingly, Embodiments of the present disclosure can be robust to phase aberrations arising from sound speed inhomogeneities (variances) in tissue. Most prior art methods of phase aberration correction are computationally intensive (recursive) and may not be practical/suitable for implementation in real-time systems.

For ultrasound imaging, techniques according to the present disclosure can provide for improved visualization of small diameter cysts and other low-contrast lesions such as fibroadenomas, carcinoma, blood vessels, and heart chambers, in real time.

Embodiments of the present disclosure can provide a low computational burden and each of implementation with commercial scanners with little or no loss in frame rate (temporal resolution) and such can be used in ultrasound-guided procedures.

While certain embodiments have been described herein, it will be understood by one skilled in the art that the methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A method of suppressing sidelobes in an ultrasound image, the method comprising:
   transmitting a focused ultrasound beam through an aperture or subaperture into a target and collecting resulting echoes;
   in receive, using a first apodization function to create a first dataset;
   in receive, using a second apodization function to create a second dataset;
   combining the two datasets to create combined RF data;
   calculating a normalized cross-correlation for each pixel;
   performing a thresholding operation on each correlation value; and
   multiplying the resulting cross-correlation matrix by the combined RF data.

2. The method of claim 1, further comprising, performing bandpass filtering.

3. The method of claim 1, further comprising, performing envelope detection.

4. The method of claim 1, further comprising, performing log-compression.

5. The method of claim 1, further comprising, performing scan conversion.

6. The method of claim 1, wherein the first apodization function comprises a uniform distribution/pattern.

7. The method of claim 1, wherein the first apodization function comprises a Hanning distribution.

8. The method of claim 1, wherein the first apodization function comprises a common-midpoint distribution.

9. The method of claim 1, wherein the first apodization function comprises a random distribution.

10. The method of claim 1, wherein the first apodization function comprises a n alternating distribution.

11. A computer-executable program product comprising a computer-readable medium with resident computer-readable instructions, the computer readable instructions comprising instructions for:
    transmitting a focused ultrasound beam through an aperture or subaperture into a target and collecting resulting echoes;
    in receive, using a first apodization function to create a first dataset;
    in receive, using a second apodization function to create a second dataset;
    combining the two datasets to create combined RF data;
    calculating a normalized cross-correlation for each pixel;
    performing a thresholding operation on each correlation value; and
    multiplying the resulting cross-correlation matrix by the combined RF data.

12. The computer-executable program product of claim 11, further comprising, performing bandpass filtering.

13. The computer-executable program product of claim 11, further comprising, performing envelope detection.

14. The computer-executable program product of claim 11, further comprising, performing log-compression.

15. The computer-executable program product of claim 11, further comprising, performing scan conversion.

16. The computer-executable program product of claim 11, wherein the first apodization function comprises a uniform distribution/pattern.

17. The computer-executable program product of claim 11, wherein the first apodization function comprises a Hanning distribution.

18. The computer-executable program product of claim 11, wherein the first apodization function comprises a common-midpoint distribution.

19. The computer-executable program product of claim 11, wherein the first apodization function comprises a random distribution.

20. The computer-executable program product of claim 11, wherein the first apodization function comprises a n alternating distribution.

21. A system for suppressing sidelobes in an ultrasound image, the system comprising:
    an array of ultrasound transducer/receiver elements configured to form an aperture or subaperture and transmit a focused ultrasound beam into a target, and to receive echoes of the ultrasound energy;
    a signal processing unit configured to form first and second data sets RX1 and RX2 from the echoes of the ultrasound energy;
    a summer for combining the data sets (RX1, RX2) and forming a combined data set;
    a cross-correlator/thresholder configured and arranged to perform a thresholding operation in RX1 and RX2 and a normalized cross-correlation of RX1 and RX2, and forming a cross-correlated data set; and
    a multiplier for multiplying the combined data set and the cross-correlated data set, to form a DAX image.

22. The system of claim 21, further comprising a filter.

23. The system of claim 21, further comprising a and log compression block.

24. The system of claim 21, further comprising a plurality of delay devices that comprise delay lines or phase delay devices.

* * * * *